US009854307B2

(12) United States Patent
Cheng et al.

(10) Patent No.: US 9,854,307 B2
(45) Date of Patent: *Dec. 26, 2017

(54) MULTIMEDIA PROGRAM RECORDING SCHEDULE MANAGER

(71) Applicant: TiVo Solutions Inc., San Carlos, CA (US)

(72) Inventors: James Cheng, Fremont, CA (US); Glen Sanford, Alameda, CA (US)

(73) Assignee: TiVo Solutions Inc., San Carlos, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/228,966

(22) Filed: Aug. 4, 2016

(65) Prior Publication Data
US 2016/0345063 A1    Nov. 24, 2016

Related U.S. Application Data

(63) Continuation of application No. 13/223,232, filed on Aug. 31, 2011, now Pat. No. 9,414,109.

(51) Int. Cl.
*H04N 7/10*     (2006.01)
*H04N 21/458*   (2011.01)
(Continued)

(52) U.S. Cl.
CPC ....... *H04N 21/458* (2013.01); *H04N 21/4147* (2013.01); *H04N 21/4302* (2013.01);
(Continued)

(58) Field of Classification Search
CPC ............. H04N 21/458; H04N 21/4821; H04N 21/6543; H04N 21/4147; H04N 21/4334;
(Continued)

(56) References Cited

U.S. PATENT DOCUMENTS 6,754,904 B1   6/2004 Cooper et al.
9,414,109 B2   8/2016 Cheng et al.
(Continued)

FOREIGN PATENT DOCUMENTS

CN      1579092     2/2005
CN     102144397    8/2011

OTHER PUBLICATIONS

United States Patent and Trademark Office, U.S. Appl. No. 13/223,232, Non-Final Office Action dated Mar. 5, 2014.
(Continued)

*Primary Examiner* — John Schnurr
(74) *Attorney, Agent, or Firm* — Haley Guiliano LLP

(57) ABSTRACT

A multimedia program recording schedule manager for DVR systems is described. In a first embodiment, for example, a method implemented by one or more server computing devices, the method comprising: receiving input selecting a particular DVR system; receiving input selecting a particular multimedia program for the particular DVR system to record on a repeat basis; adding the particular multimedia program to a server-side instance of a repeat recording schedule for the particular DVR system; and synchronizing the server-side instance of the repeat recording schedule with another instance of a repeat recording schedule for the particular DVR system resulting in the addition of the particular multimedia program to the other instance of the repeat recording schedule. In one embodiment, the other instance of the repeat recording schedule for the particular DVR system is a data component of the particular DVR system.

18 Claims, 10 Drawing Sheets

(51) Int. Cl.
*H04N 21/432* (2011.01)
*H04N 21/482* (2011.01)
*H04N 21/6543* (2011.01)
*H04N 21/4147* (2011.01)
*H04N 21/43* (2011.01)
*H04N 21/433* (2011.01)
*H04N 21/643* (2011.01)
*H04N 21/854* (2011.01)

(52) U.S. Cl.
CPC ..... *H04N 21/4325* (2013.01); *H04N 21/4334* (2013.01); *H04N 21/4821* (2013.01); *H04N 21/64322* (2013.01); *H04N 21/6543* (2013.01); *H04N 21/854* (2013.01)

(58) Field of Classification Search
CPC ......... H04N 21/4302; H04N 21/64322; H04N 21/854
See application file for complete search history.

(56) References Cited

U.S. PATENT DOCUMENTS

| | | | |
|---|---|---|---|
| 2005/0108519 A1* | 5/2005 | Barton | H04L 9/0897 713/155 |
| 2005/0108769 A1 | 5/2005 | Arnold et al. | |
| 2010/0175085 A1 | 7/2010 | Seol | |
| 2011/0162009 A1 | 6/2011 | Adimatyam et al. | |
| 2013/0055312 A1 | 2/2013 | Cheng et al. | |

OTHER PUBLICATIONS

United States Patent and Trademark Office, U.S. Appl. No. 13/223,232, Final Office Action dated Aug. 4, 2014.
United States Patent and Trademark Office, U.S. Appl. No. 13/223,232, Non-Final Office Action dated Feb. 23, 2015.
United States Patent and Trademark Office, U.S. Appl. No. 13/223,232, Final Office Action dated Jun. 24, 2015.
United States Patent and Trademark Office, U.S. Appl. No. 13/223,232, Advisory Action dated Sep. 3, 2015.
United States Patent and Trademark Office, U.S. Appl. No. 13/223,232, Non-Final Office Action dated Nov. 10, 2015.
United States Patent and Trademark Office, U.S. Appl. No. 13/223,232, Notice of Allowance dated Apr. 25, 2016.
Chinese Patent Office, Application No. 201210313579.8, Foreign Office Action dated Oct. 10, 2014.
Chinese Patent Office, Application No. 201210313579.8, Foreign Office Action dated May 25, 2015.
Chinese Patent Office, Application No. 201210313579.8, Pending Claims as of Oct. 10, 2014.
Chinese Patent Office, Application No. 201210313579.8, Pending Claims as of May 27, 2015.

* cited by examiner

MULTIMEDIA PROGRAM RECORDING SCHEDULE MANAGER

CROSS-REFERENCE TO RELATED APPLICATIONS

This application is a Continuation of U.S. patent application Ser. No. 13/223,232, entitled "MULTIMEDIA PROGRAM RECORDING SCHEDULE MANAGER," filed Aug. 31, 2011. The entire contents of the above mentioned application are hereby incorporated by reference for all purposes as if fully set forth herein. The applicant(s) hereby rescind any disclaimer of claim scope in the parent application(s) or the prosecution history thereof and advise the USPTO that the claims in this application may be broader than any claim in the parent application.

TECHNICAL FIELD

The present invention relates to management of program recording schedules for Digital Video Recorder (DVR) systems.

BACKGROUND

Today, multimedia content and programming is available from a variety of different multimedia content providers. For example, today there are many broadcast television, cable, satellite, and Internet service operators that can provide multimedia programming to consumers in their homes and elsewhere. Further, many consumers consume multimedia programming from more than one content provider. For example, it is increasingly common for a consumer to consume multimedia programming from a broadcast television, cable, or satellite content provider in addition to one or more Internet-based content providers. This consumer practice of "multi-sourcing" multimedia programming should become more and more prevalent as the availability of high-bandwidth Internet connections to the home and mobile computing devices increases.

With the growth in availability of multimedia programming from content providers, a consumer can often be in a situation where a program of interest is being offered by a content provider at a time that is not convenient for consumption or at a time that conflicts with the offering of another program of interest. For example, the season premiere of a highly anticipated television program may be broadcast by a content provider at the same time the content provider is also broadcasting a live sports event. To allow consumers to consume multimedia programming of interest at times that are most convenient to the consumers, Digital Video Recording (DVR) systems have been developed. A DVR system allows a user to record multimedia programs at the time they are offered by content providers yet consume the recorded multimedia programs at a later time. For example, the DVR system may allow the user to view the live sports event while recording the season premiere of the television program and allow the user to view the season premiere after watching the live sports event even though both the live sports event and the season premiere were broadcast by the content provider at the same time.

Typically, the DVR system itself is located where the user consumes multimedia content from content providers. For example, the DVR system may be a component of the user's in-home television system that receives multimedia content via a cable, network, or satellite link. The DVR system typically stores recorded multimedia programming in a digital form to a local storage device component of to the DVR system. Further, the DVR system may provide program recording scheduling capabilities that allow the user to configure the DVR system with a program recording schedule. For example, the DVR system may be configured to automatically record a certain television channel for one hour every Friday at 8 μm. The program recording schedule is typically stored and maintained locally as a data component of the DVR system. As a result, if an old or defective DVR system is replaced with a new DVR system, the program recording schedule on the replaced DVR system may need to be re-configured by the user on the new DVR system. Typically, this means that the user is required to duplicate work already performed for the replaced DVR system. The user may find this duplicative work to be tedious and time-consuming.

Another drawback to typical approaches for managing program recording schedules in DVR systems is that each DVR system may have to be separately and independently configured by the user with a program recording schedule. This is inconvenient if the user operates multiple DVR systems. For example, the user may operate one DVR system attached to a television in the living room and another DVR system attached to a television in a bedroom. If the user wants to view a recorded program in two different locations or from two different DVR systems, copying or moving the program between DVR systems may not be a viable option. For example, it may be a violation of copyright restrictions to copy a multimedia program stored on one DVR system to another DVR system. As another example, the DVR system may record multimedia content with Digital Rights Management (DRM) protection which prevents playback of recorded multimedia content on any DVR system other than the one that recorded the content. Further, the data size of a recorded program may so large that copying or moving the recorded program from one DVR system to another, even over a high-bandwidth link, may take a prohibitive amount of time. One possible solution to this dilemma is for the user to separately and independently configure each of the multiple DVR systems to record the desired program. However, as noted above, the user may find this duplicative work to be tedious and time-consuming.

Given the drawbacks of typical approaches for managing program recording schedules in DVR systems, an improved technique is needed.

BRIEF DESCRIPTION OF DRAWINGS

The present invention is illustrated by way of example, and not by way of limitation, in the figures of the accompanying drawings and in which like reference numerals refer to similar elements and in which.

DETAILED DESCRIPTION

Figure 1:
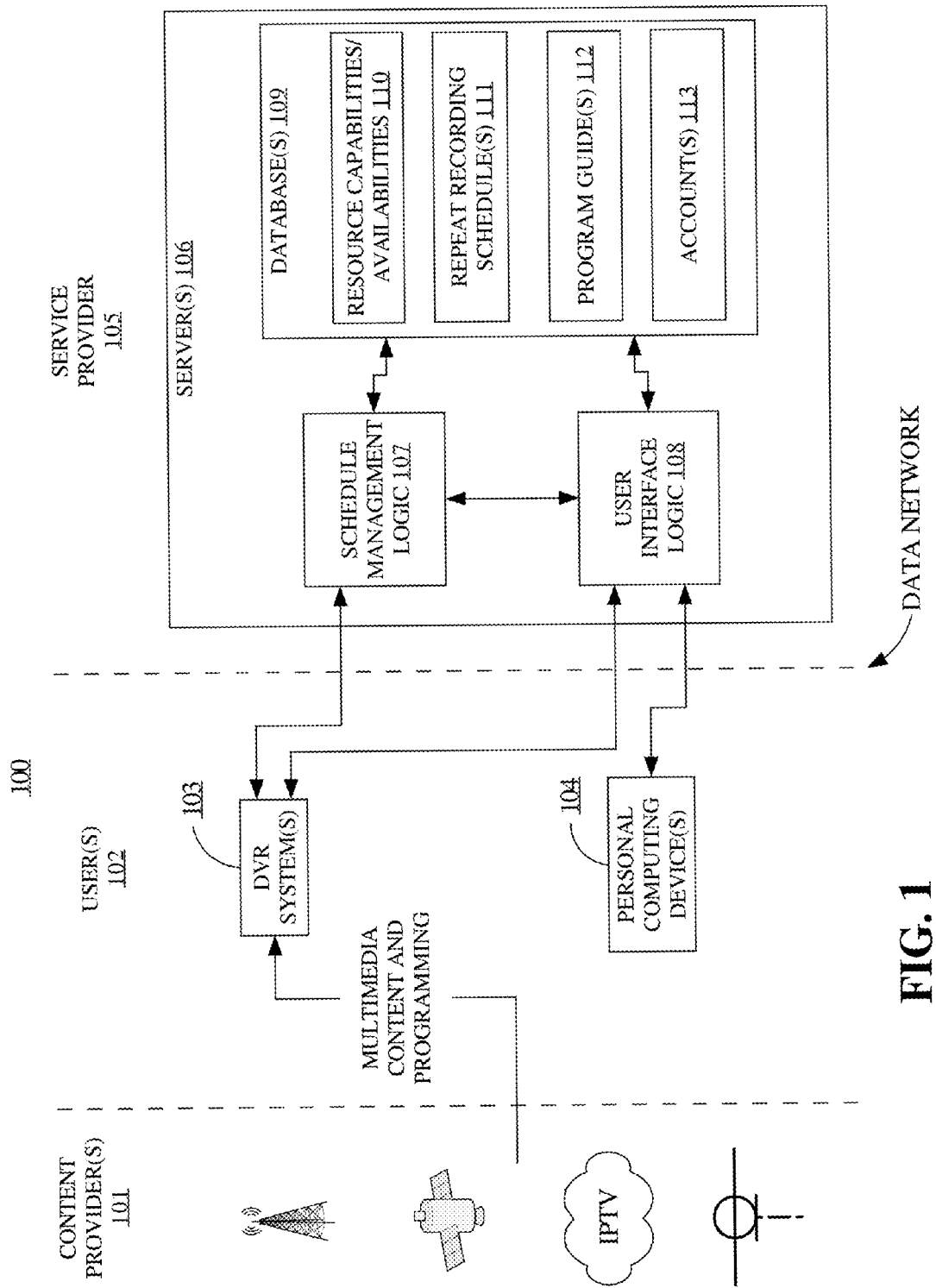
FIG. 1 is a block diagram and schematic illustration of a program recording schedule management system, according to a possible embodiment of the invention.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Several features are described hereafter that can each be used independently of one another or with any combination of the other features. However, any individual feature might not address any of the problems discussed above or might only address one of the problems discussed above. Some of the problems discussed above might not be fully addressed by any of the features described herein. Although headings are provided, information related to a particular heading, but not found in the section having that heading, may also be found elsewhere in the specification.

Example features are described according to the following outline:

1.0 OVERVIEW
2.0 REPEAT RECORDING SCHEDULE MANAGEMENT SYSTEM—FUNCTIONAL OVERVIEW
3.0 REPEAT RECORDING SCHEDULE MANAGEMENT SYSTEM—SYSTEM OVERVIEW
4.0 EXAMPLE DVR SYSTEM
5.0 EXAMPLE DVR SYSTEM REGISTRATION
6.0 EXAMPLE PROGRAM GUIDE
7.0 EXAMPLE OF CREATING A REPEAT RECORDING SCHEDULE
8.0 EXAMPLE OF CREATING A REPEAT RECORDING SCHEDULE FOR A DVR SYSTEM BASED ON ANOTHER REPEAT RECORDING SCHEDULE FOR ANOTHER DVR SYSTEM
9.0 EXAMPLE OF PREVENTING CONCURRENT RECORDING CONFLICTS
10.0 EXAMPLE COMPUTING DEVICE
11.0 EXTENSIONS AND ALTERNATIVES 1.0 OVERVIEW

A multimedia program recording schedule manager for DVR systems is described. In a first possible embodiment, for example, a method implemented by one or more server computing devices, the method comprising: receiving input selecting a particular DVR system; receiving input selecting a particular multimedia program for the particular DVR system to record on a repeat basis; adding the particular multimedia program to a server-side instance of a repeat recording schedule for the particular DVR system; and synchronizing the server-side instance of the repeat recording schedule with another instance of a repeat recording schedule for the particular DVR system resulting in the addition of the particular multimedia program to the other instance of the repeat recording schedule; wherein the other instance of the repeat recording schedule for the particular DVR system is a data component of the particular DVR system.

In one aspect of the first possible embodiment, after the synchronizing, the server-side instance of the repeat recording schedule comprises an ordered listing of multimedia program identifiers and associated channel identifiers and the other instance of the repeat recording schedule comprises the same ordered listing of multimedia program identifiers and associated channel identifiers.

In another aspect of the first possible embodiment, in response to receiving search criteria, searching a program guide associated with the DVR system to identify one or more multimedia programs including the particular multimedia program that satisfy the search criteria.

In yet another aspect of the first possible embodiment, the other instance of the repeat recording schedule for the particular DVR system is stored on a non-volatile storage medium of the particular DVR system.

In still yet another aspect of the first possible embodiment, synchronizing the server-side instance of the repeat recording schedule with the other instance of the repeat recording schedule comprises establishing a network connection with the particular DVR system and sending data representing the particular multimedia program to the particular DVR system over the network connection.

In still yet another aspect of the first possible embodiment, the network connection is a Transmission Control Protocol (TCP) connection.

In still yet another aspect of the first possible embodiment, receiving and storing data reflecting a concurrent recording capability of the particular DVR system.

In a second possible embodiment, a method implemented by one or more server computing devices, the method comprising: receiving input selecting a source DVR system associated with a user; receiving input selecting a target DVR system associated with the user; causing presentation of a user interface to the user, the user interface comprising a set of one or more selectable items, each selectable item of the set of selectable items corresponding to a repeat recording item of a repeat recording schedule for the source DVR system, each repeat recording item of the repeat recording schedule for the source DVR system comprising an identifier of a multimedia program; receiving input indicating selection of a particular selectable item of the set of selectable items; identifying a particular multimedia program from one or more program guides associated with the target DVR system based on the identifier of the multimedia program of the repeat recording item corresponding to the particular selectable item; adding the particular multimedia program to a server-side instance of a repeat recording schedule for the target DVR system.

In an aspect of the second possible embodiment, synchronizing the server-side instance of the repeat recording schedule with another instance of a repeat recording schedule for the target DVR system resulting in the addition of the particular multimedia program to the other instance of the repeat recording schedule; wherein the other instance of the repeat recording schedule for the target DVR system is a data component of the target DVR system.

In a third possible embodiment, a method implemented by one or more server computing devices, the method comprising: receiving and storing data reflecting a concurrent recording capability of a target DVR system associated with a user; receiving input selecting a source DVR system associated with the user; receiving input selecting the target DVR system; causing presentation of a user interface to the user, the user interface comprising a set of one or more selectable items, each selectable item of the set of selectable items corresponding to a repeat recording item of a repeat recording schedule for the source DVR system, each repeat recording item of the repeat recording schedule for the source DVR system comprising an identifier of a multimedia program; receiving input indicating selection of a particular selectable item of the set of selectable items; identifying a particular multimedia program from one or more program guides associated with the target DVR system based on the identifier of the multimedia program of the repeat recording item corresponding to the particular selectable item; in response to determining, based on the data reflecting the concurrent recording capability of the target DVR system, that adding the particular multimedia program to a repeat recording schedule for the target DVR system would cause a concurrent recording conflict, causing notification to the user of the concurrent recording conflict.

In an aspect of the third possible embodiment, determining, based on the data reflecting the concurrent recording capability of the target DVR system, that adding the particular multimedia program to a repeat recording schedule for the target DVR system would cause a concurrent recording conflict includes determining, from the one or more program guides associated with the target DVR system, any overlap between episodes of multimedia programs concurrently listed in the repeat recording schedule and episodes of the particular multimedia program.

Other possible embodiments include, without limitation, a non-transitory computer-readable medium that includes processor-executable instructions that enable a processing unit to implement one or more aspects of the disclosed methods as well as a system configured to implement one or more aspects of the disclosed methods.

2.0 REPEAT RECORDING SCHEDULE MANAGEMENT SYSTEM—FUNCTIONAL OVERVIEW

Historically, service providers that provide data to DVR systems over a data network typically only provide program guide data and updates for software executed on the DVR systems. This program guide data typically comprises information organizing multimedia programs offered by content providers in a daily, weekly, season-long, or other time-period schedule. Generally, the program guide comprises a listing of multimedia programs offered by content providers, the channels on which the programs are offered, and the times the programs are offered on the channels. For example, the program guide data might be a set of television listings or an interactive or non-interactive electronic program guide.

With this program guide data, a DVR system can be configured by a user to record multimedia programs according to the information provided in the program guide. For example, the user might interact with an interface of the DVR system to select a particular program to record.

Further, with this program guide data, the DVR system can be configured by the user to record selected programs autonomously from the service provider. In other words, once the program guide data has been obtained by the DVR system, the user can schedule the DVR system to record programs of interest without the DVR system having to communicate with the service provider. When configured in this way, data representing the recording schedule is stored locally as a data component of the DVR system. For example, the DVR system may comprise a hard disk or other data storage medium for storing the recording schedule data.

Thus, historical approaches for managing programming recording schedules for DVR systems typically involve the DVR systems obtaining a program guide from a service provider and thereafter operating autonomously from the service provider and other DVR systems. In particular, in the historical approaches, program recording schedule configuration is tightly coupled to the DVR system it configures. Thus, if the configured DVR system is decommissioned or replaced, the program recording schedule configuration is lost. Further, there is no effort with the historical approaches to leverage the program recording schedule configuration of one DVR system when configuring another DVR system. Finally, the historical approaches do not provide tools to the user for managing multiple DVR systems as a cluster such that one DVR system in the cluster can assume recording workload that cannot be handled by another DVR system in the cluster.

In contrast to historical approaches, a possible embodiment incorporates a program recording schedule management system that allows users to more easily and efficiently configure their DVR systems with repeat recording schedules. A repeat recording schedule is a recording schedule that specifies multimedia program series (e.g., video, audio, etc.) and the content provider channels, URLs, etc., the program series are offered on such that a DVR system, when configured with the repeat recording schedule, will record some or all instances (i.e., episodes) of the multimedia program series on the channels, URLs, etc., in accordance with the repeat recording schedule.

With this system, it is possible for a user to configure a DVR system with a repeat recording schedule without having to recreate the repeat recording schedule from scratch. For example, if the user replaces an old or damaged DVR system with a new DVR system, the repeat recording schedule on the replaced DVR system can be configured on the new DVR system without the user having to recreate the repeat recording schedule on the new DVR system by repeating all of the configuration steps taken when the schedule was originally created on the replaced DVR system.

It is also possible with the system for the user to create repeat recording schedules for multiple DVR systems without having to configure each of the multiple DVR systems separately and independently. Instead, the user can leverage a repeat recording schedule created for one of the multiple DVR systems when creating a repeat recording schedule for another of the multiple DVR systems.

The system may also include a scheduling component for automatically scheduling programs of interest for recording amongst a user's multiple DVR systems. The scheduling component can intelligently determine which of the user's multiple DVR systems is best suited to record a given program of interest on a repeating basis based upon resource capability and availability of the multiple DVR systems. As one example, if a particular DVR system selected by the user to record a program series of interest on a repeating basis is low on available local storage space for storing recorded programs, the scheduling component may suggest a different one of the user's DVR systems that is not low on available local storage space for recording the program series on a repeating basis. As another example, if scheduling a particular DVR system to record a program series of interest on a repeating basis would cause the particular DVR system to exceed its concurrent recording capabilities, the scheduling component may suggest a different one of the user's DVR systems that would not be overscheduled.

An approach of a possible embodiment is to store and manage DVR system repeat recording schedules at a location remote from the DVR systems themselves. At the remote location is a program recording schedule manager. The schedule manager may be hosted by a server or multiple servers. The schedule manager is connected to the DVR systems via a data network (e.g., the Internet, an intranet, local network, satellite network, microwave network, cable network, wireless network, telephone line, etc.). The schedule manager provides a user interface for users to configure repeat recording schedules for their DVR systems. The schedule manager configures the users' remote DVR systems over the data network in accordance with locally maintained and stored repeat recording schedules.

By storing and managing repeat recording schedules for DVR systems at a network location remote from the DVR systems themselves, DVR systems can be decommissioned and replaced without losing all repeat recording schedule configurations for those DVR systems. Further, a user can configure and reconfigure a DVR system with a repeat recording schedule without having to create a schedule from the ground up, saving time and increasing enjoyment of the DVR system.

In addition, by connecting multiple DVR systems to the schedule manager, the schedule manager can be provided a "view" of all of a user's DVR systems including their resource capabilities, resource availabilities, and repeat recording schedule configurations via, for example, a web interface accessible by the user's web browser.

In some cases, the user can configure a DVR system with a repeat recording schedule by leveraging an existing repeat recording schedule configuration. In one possible embodiment, the lifecycle of a repeat recording schedule configuration is independent of the lifecycle of the DVR system(s) configured according to that schedule, thereby allowing the user to decommission, replace, or upgrade DVR system(s) without losing a repeat recording schedule configuration or having to recreate a repeat recording schedule configuration from scratch.

In addition, a new DVR system can be configured with a repeat recording schedule based on an existing repeat recording schedule configuration, perhaps even for another DVR system, without having to create a schedule configuration for the new DVR system from the ground up.

In accordance with certain possible embodiments of the present invention, the schedule manager system collects resource capability and availability information about a user's multiple DVR systems. Such collected information allows the schedule manager system to aid the user in making informed decisions and how best to schedule programs for recording on a repeat basis amongst the user's multiple DVR systems.

Thus, according to possible embodiments, multimedia program recording schedule management systems are disclosed that include, for example, building blocks such as: server computer hardware for hosting and executing logic (e.g., software) for performing various repeat recording schedule management and user interface functions as described herein; a database operatively coupled to the server-side logic for storing and retrieving repeat recording schedule data, program guides, resource capability data, and resource availability data for remote DVR systems; and a network interface for operatively coupling the logic to remote DVR systems over a data network for communicating with remote DVR systems including sending and receiving repeat recording schedule data to and from remote DVR systems and receiving resource capability data and resource availability data from remote DVR systems.

It will be understood that these, and other associated building blocks and components, may be configured as stand-alone elements, or may be combined together in one or more assemblies, as needed or appropriate for the particular implementation at hand.

3.0 REPEAT RECORDING SCHEDULE MANAGEMENT SYSTEM—SYSTEM OVERVIEW

Referring now to FIG. 1, therein is shown a block diagram and schematic illustration of a repeat recording schedule management system 100 according to a possible embodiment. The actors in the system 100 include content provider(s) 101, user(s) 102, and a service provider 105. The content provider(s) 101 provide multimedia content and programming to the DVR system(s) 103. User(s) 102 operate the DVR system(s) 103 and personal computing device(s) 104 and maintain account(s) 113 with the service provider 105. The service provider 105, among other functions as described in greater detail herein, receives data and information from the DVR system(s) 103 over a data network and provides data and information to the DVR system(s) 103 over the data network. The service provider 105 may provide data and information to the DVR system(s) 103 on a subscription basis for a fee paid by the users(s) 102 to the service provider 105.

While in FIG. 1 the service provider 105 is shown separately from the content provider(s) 101, it should be understood that a content provider 101 and the service provider 105 may be one and the same and there is no requirement that the service provider 105 be under control of a management entity separate from the content provider(s) 101.

The service provider 105 operates one or more server(s) 106 comprising schedule management logic 107, user interface logic 108, and a database 109. In a possible embodiment, the schedule management logic 107 and the user interface logic 108 are implemented in server software operating in an Internet-connected environment running under an operating system, such as the Microsoft Windows operating system. However, the logics 107 and 108 are not limited to any one particular application or any particular environment. Instead, the logics 107 and 108 may be advantageously embodied on a variety of different platforms, including Linux, UNIX, Mac OS, FreeBSD, and the like. Each of the server(s) 106 need not comprise all of the schedule management logic 107, the user interface logic 108, and the database 109. Some of the server(s) 106 may comprise only some of these components or only portions of one or more of these components. For example, some of the servers 106 may be dedicated to executing the user interface logic 108 while other servers 106 may be dedicated to executing the schedule management logic 107. Further, the database 109 may be partitioned across geographically dispersed servers 106 to improve the locality of reference to database 109 data by DVR systems 103 and personal computing devices 104 according to the requirements of the implementation at hand.

Figure 9:
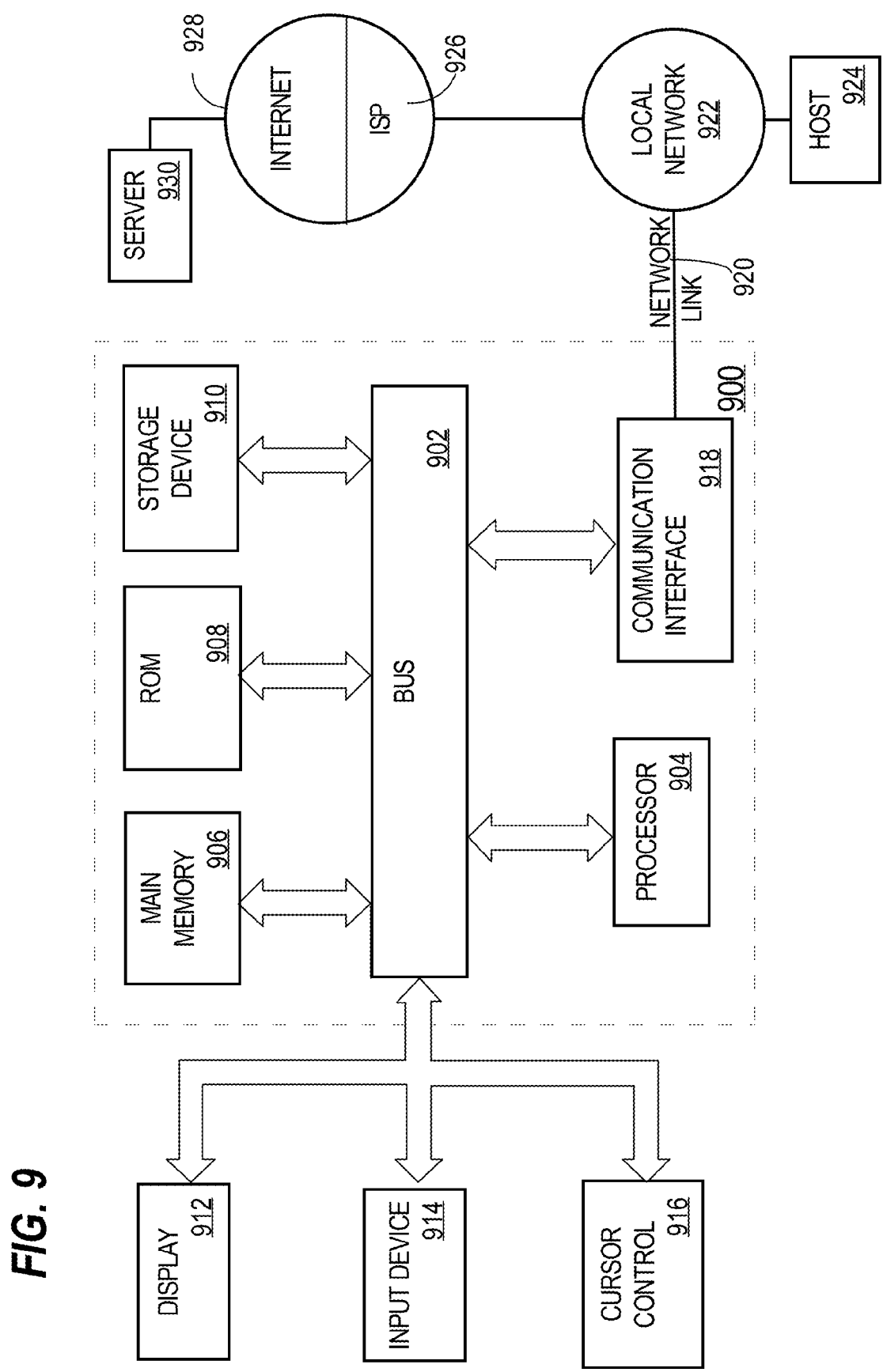
FIG. 9 is a block diagram and schematic illustration of a computer system on which a possible embodiment of the invention may be implemented.

A server 106 may be implemented on a conventional or general-purpose computer system, such as the computer system 900 of FIG. 9. For purposes of discussion, the following description will present examples in which it will be assumed there exist one or more "servers" that communicate with one or more DVR systems and/or one or more personal computing devices ("clients"). The system, however, is not limited to any particular environment or device configuration. In particular, a client/server distinction is used to provide a framework for discussion. The system may be implemented in any type of system architecture or processing environment capable of supporting the techniques for managing program recording schedules as disclosed herein.

The user interface logic 108 is operatively coupled to the DVR system(s) 103 and the personal computing device(s) 104 via one or more data networks. Through the user interface logic 108, a user 102 can view, create, and update repeat recording schedule(s) 111 for the user's DVR system(s) 103. When creating or updating a repeat recording schedule 111 for a DVR system 103, the user 102 can search and browse the program guide 112 associated with the DVR systems 103 through the user interface logic 108 to select one or more programs to add to the repeat recording schedule 111 for the DVR system 103. If a user operates more than one DVR system 103, a user can simultaneously view side-by-side repeat recording schedules 111 for the user's multiple DVR systems 103. With the side-by-side view, the user can select one or more programs from the repeat recording schedule 111 of one of the user's multiple DVR systems 103 to be copied or moved to the repeat recording schedule 111 of another of the user's other DVR systems 103. These and other user interface operations performed by user interface logic 108 are described in greater detail below.

The schedule management logic 107 is operatively coupled to the DVR system(s) 103 via one or more data networks (e.g., the Internet, an intranet, local network, satellite network, microwave network, cable network, wireless network, telephone line, etc.). The schedule management logic 107 receives resource capability and availability data from the DVR system(s) 103. Received resource capability and availability data is stored in the database(s) 109 as resource capability/availability data 110. Such data 110 may be used by the schedule management logic 107 when determining how to assign a repeat recording request from a user 102 amongst the user's multiple DVR systems 103, if the user 102 operates multiple DVR systems 103. Resource capability/availability data 110 may include, for example, for each of the user's DVR systems 103, information about the multimedia content storage capability and availability of the DVR system and concurrent recording capability of the DVR system.

In a possible embodiment, the schedule management logic 107 also periodically synchronizes the repeat recording schedule(s) of the DVR system(s) 103 stored in local memories of the DVR system(s) 103 with the repeat recording schedule(s) 111 for the DVR system(s) 103 stored in the database(s) 109. These and other program schedule management operations performed by schedule management logic 107 are described in greater detail below.

For the purpose of providing a clear example, schedule management logic 107 and user interface logic 108 are shown separately in FIG. 1. However, some or all of schedule management logic 107 may be implemented as part of user interface logic 108 and vice versa. Further, schedule management logic 107 and user interface logic 108 each may perform other functions and operations in addition to the functions and operations described herein. Schedule management logic 107 and user interface logic 108 may be implemented as software, hardware, or combination of software and hardware.

The database(s) 109 stores resource capabilities and availabilities data 110 for the DVR system(s) 103, repeat recording schedule data 111 for the DVR system(s) 103, program guide data 112 for the DVR system(s) 103, and account information for the user(s) 102. The database(s) 109 may be implemented using any type of database suitable for the implementation at hand and the invention is not limited to any particular type of database. For example, the database(s) 109 may be a relational database, a set of eXtensible Markup Language (XML) files, object database, a combination of different database types, etc.

The content provider(s) 101, the DVR system(s) 103, the personal computing device(s) 104, and the server(s) 106 may each be communicatively coupled to one or more of the others via one or more data networks. The content provider(s) 103, the DVR system(s) 103, the personal computing device(s) 104, and the server(s) 106 may each be connected to the one or more data networks via wired or wireless connections. Typical wired connections include but are not limited to Ethernet, narrowband POTS, xDSL, Hybrid Fiber Coaxial (HFC) and cable, which can utilize twisted pair copper wires, coaxial cable, fiber or any combination thereof. Typical wireless connections include but are not limited to Wireless LAN (IEEE 802.11), Cellular, PCS, CDPD, GPRS, and Bluetooth, each of which typically operate at a particular radio frequency.

Personal computing device(s) 104 can include desktop computers, laptop computers, tablet computers, handheld computing devices such as cellular phones and portable media players, and the like. In one possible embodiment, a personal computing device 104 is configured with a web browsing or similar application capable of interfacing with the service provider 105 through user interface logic 108. In this embodiment, user interface logic 108 is capable of driving display of web pages and web content at the personal computing device(s) 104, responding to requests from the personal computing device(s) 104 (e.g., HyperText Transfer Protocol (HTTP)-based requests, etc.), and providing responses to the requests to the personal computing device(s) 104. In another possible embodiment, a personal computing device 104 is configured with a native desktop application capable of interfacing with the service provider 105 through user interface logic 108. In this embodiment, user interface logic 108 is capable of responding to requests (e.g., Transmission Control Protocol/Internet Protocol (TCP/IP) requests) from the native application executing on the personal computing device and providing responses to the requests to the native application. The native application uses information in the returned responses to drive a user interface presented on a display of the personal computing device.

The content provider(s) 101 may provide multimedia content and programming to the DVR system(s) 103 via radio frequency broadcast, satellite signal, cable television (CATV) signal, data network, etc. The multimedia content and programming may include a combination of text, data, audio, still images, animation, video, interactivity, etc. The content provider(s) 101 may also provide multimedia content and programming to the DVR system(s) 103 over a data network. For example, a content provider 101 may unicast, multicast, or broadcast multimedia content and programming to the DVR system(s) 103 over one or more data networks using an Internet Protocol (IP)-based network protocol. DVR system(s) 103 may also download or retrieve multimedia content from content provider 101 servers over one or more data networks using an IP-based network protocol.

4.0 EXAMPLE DVR SYSTEM

Figure 2:
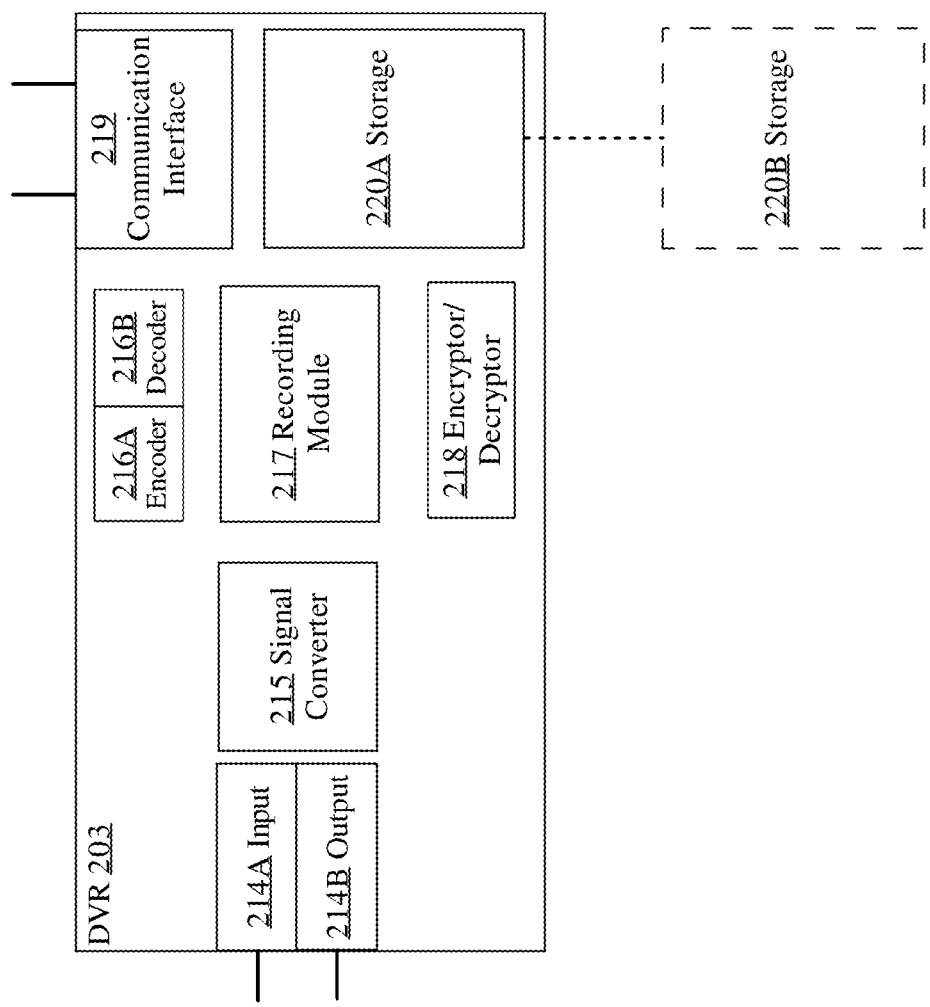
FIG. 2 is a block diagram and schematic illustration of the components of a DVR system, according to a possible embodiment of the invention.

Referring now to FIG. 2, therein is shown a block diagram and schematic illustration of components of an example DVR system 203, according to a possible embodiment of the invention. DVR system 203 generally comprises one or more components, signified by signal converter 215, that may be used to accept a digital data stream or digitize an analog television signal and convert it into a digital data stream. An example of the internal structure and operation of a DVR system is further described in U.S. Pat. No. 6,233,389, the entire contents of which is hereby incorporated by reference as if fully set forth herein.

DVR system 203 receives broadcast signals from an antenna, from a cable TV system, satellite receiver, etc., via input 214A. Input 214A may comprise one or more tuning modules ("tuners") that allow one or more signals to be received and recorded simultaneously. For example, a TV input stream received by input 214A may take the form of a National Television Standards Committee (NTSC) compliant signal or a Phase Alternating Line (PAL) compliant broadcast signal. For another example, a TV input stream received by input 214A may take a digital form such as a Digital Satellite System (DSS) compliant signal, a Digital Broadcast Services (DBS) compliant signal, an Advanced Television Standards Committee (ATSC) compliant signal, MPEG-4, etc. DBS, DSS, and ATSC are based on standards called Moving Pictures Experts Group 2 (MPEG-2) and MPEG-2 Transport. MPEG-2 Transport is a standard for formatting the digital data stream from the TV source transmitter so that a TV receiver can disassemble the input stream to find programs in the multiplexed signal.

An MPEG-2 transport multiplex supports multiple programs in the same broadcast channel with multiple video and audio feeds and private data. Input 214A tunes to a particular program in a channel, extracts a specified MPEG stream from the channel, and feeds the MPEG stream to the rest of the system. Analog TV signals are encoded into a similar MPEG format using separate video and audio encoders, such that the remainder of the system is unaware of how the signal was obtained. Information may be modulated into the vertical blanking interval (VBI) of the analog TV signal in a number of standard ways; for example, the North American Broadcast Teletext Standard (NABTS) may be used to modulate information onto certain lines of an NTSC signal, which the FCC mandates the use of a certain other line for closed caption (CC) and extended data services (EDS). Such signals are decoded by input 214A and passed to the other modules as if the signals had been delivered via an MPEG-2 private data channel.

Recording module 217 records the incoming data stream by storing the digital data stream on at least one storage facility, signified by storage 220A/220B that is designed to retain segments of the digital data stream. Storage 220A/220B may be one or more non-volatile storage devices (e.g., hard disk, solid state drive, USB external hard drive, USB external memory stick, USB external solid state drive, network accessible storage device, etc.) that are internal 220A and/or external 220B. A signal converter 215 retrieves segments of the data stream, converts the data stream into an analog signal, and then modulates the signal onto a RF carrier, via output 214B, through which the signal is delivered to a standard TV set. Output 214B may alternatively deliver a digital signal to a TV set or video monitor with signal converter 215, converting the data stream into an appropriate digital signal. For example, DVR system 203 may utilize a High-Definition Multimedia Interface (HDMI) for sending digital signals to a TV via a HDMI cable.

DVR system 203 also includes a communication interface 219, through which the DVR system 203 communicates with a data network via Ethernet, wireless network, modem, or other communications standard. DVR system 203 may communicate (e.g., send and receive data) with service provider 105 server(s) 106 via communication interface 219 using a connection-oriented transport protocol (e.g., TCP/IP) or a connectionless transport protocol (e.g., UDP). Communication between the DVR system 203 and service provider 105 may use a secure distribution architecture to transfer data between the DVR system 203 and the service provider 105 such that both the service data and the user's privacy are protected.

DVR system 203 may also receive multimedia content streams (e.g., MPEG-2 transport streams, MPEG-4 transport streams, etc.) from content provider(s) 102 via communication interface 219. For example, a content provider 102 may deliver a multimedia content stream to communication interface 219 via Internet Protocol (IP) multicast or via IP unicast. DVR system 203 may retrieve a multimedia content stream from content provider(s) 102 via communication interface 219. Multimedia content streams received via communication interface 219 can be provided to recording module 217 for storage on storage 220A/220B.

The DVR system 203 may be integrated into a TV system such that the components described above are housed in a TV set capable of performing the functions of each component of the DVR system 203.

In another possible embodiment, the DVR system 203 generally comprises one or more components necessary to receive, record, store, transfer and playback digital data signals from one or more sources, such as a PC, a DVR, a content provider, or content server. The DVR system 203 can transfer digital data signals to another DVR, PC, or any other suitably configured device, such as a handheld device, cell phone, etc. The DVR system 203 may encode or decode digital signals via encoder 216A and decoder 216B into one or more formats for playback, storage or transfer. According to a possible embodiment, encoder 216A produces MPEG streams. According to another possible embodiment, encoder 216A produces streams that are encoded using a different codec. Decoder 216B decodes the streams encoded by encoder 216A or streams that are stored in the format in which the streams were received using an appropriate decoder. The DVR system 203 can also encrypt or decrypt digital data signals using encryptor/decryptor 218 for storage, transfer or playback of the digital data signals.

5.0 EXAMPLE DVR SYSTEM REGISTRATION

Figure 3:
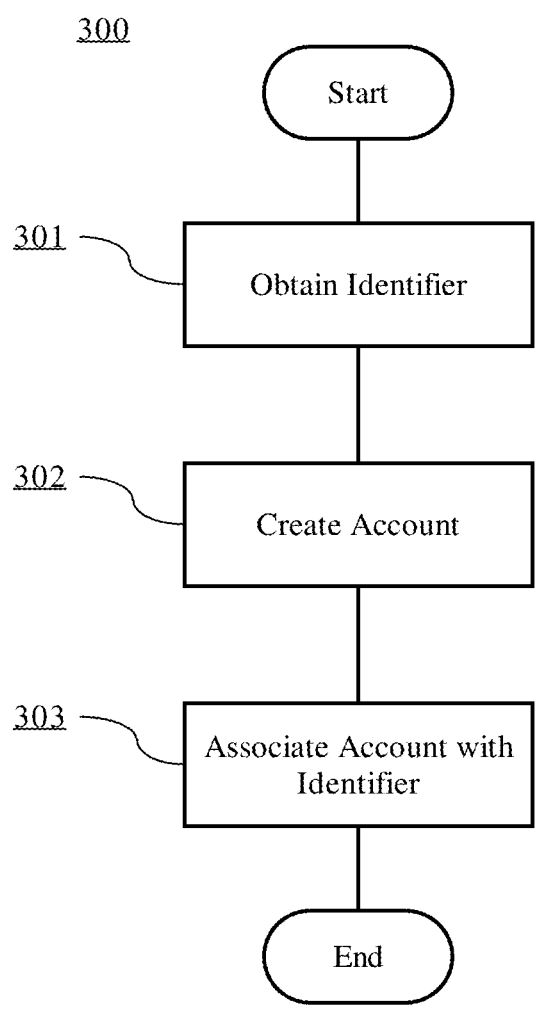
FIG. 3 is a flowchart illustrating steps of a DVR system registration process, according to a possible embodiment of the invention.

In one possible embodiment, a DVR system registration process is performed before the service provider begins management of repeat recording schedules for the DVR system. Referring to FIG. 3, therein is shown in flowchart form steps of an example DVR system registration process 300. The process 300 is performed by logic (e.g., software, firmware, etc.) executed by one or more server(s) 106 of the service provider 105. In one possible embodiment, the process is initiated before the given DVR system has been delivered to or purchased by a user 102.

At step 301, an identifier of the given DVR system is obtained. Any identifier that uniquely identifies the given DVR system may be used. For example, the serial number of the given DVR system or other manufacturer assigned identifier. In one possible embodiment, the identifier is obtained before the given DVR system is delivered to or purchased by a user. For example, as part of inventory processing performed by the service provider, the identifier may be entered into the database(s) 150.

In another possible embodiment that is not exclusive of a possible embodiment in which the identifier is obtained before the given DVR system is delivered to or purchased by a user, the identifier is obtained from the given DVR system after the given DVR system has been configured by the user at a place of deployment (e.g., the user's home). Note that the place of deployment need not be fixed such as when, for example, the DVR system is part of a mobile computing device. In this embodiment, the given DVR system is operatively coupled by the user to a data network that connects the given DVR system to the service provider. Once coupled, the given DVR system detects and communicates the identifier to the service provider. Upon receiving the identifier communicated by the DVR system, the identifier is stored in the service provider database(s).

In one possible embodiment, the DVR system comprises executable logic (e.g., executable software or firmware instructions) which, when executed by the DVR system, determines an identifier for the DVR system and communicates the identifier to the service provider over the data network. Communication can be initiated by the service provider or the DVR system. For example, the DVR system or the service provider may initiate and establish a Transmission Control Protocol (TCP) connection to the other and over which the identifier of the DVR system is communicated from the DVR system to the service provider. The logic executed by the DVR system may inspect or access a memory of the DVR system to obtain the identifier. The identifier may have been stored or burned-in the memory by the manufacturer of the DVR system.

In a possible embodiment, the logic for determining and communicating the identifier executed by the DVR system is provided to the DVR system by the service provider. For example, the service provider may provide the logic to the DVR system in an initial communication with the DVR system after the DVR system has been operatively coupled to the data network by the user.

At this point, the service provider has an identifier of the given DVR system stored in the database(s) but the identifier may not yet have been associated with a user account 113. At steps 302 and 303 of process 300, a user account is created and associated in the database(s) with the identifier of the given DVR system. To do so, in one possible embodiment, the user of the DVR system accesses an account activation interface of the service provider driven by user interface logic 108. The account activation interface may be accessed either through the given DVR system or a personal computing device 104 of the user. For example, the user may use a remote control device or other input device to interact with the account activation interface as presented on the user's television screen to which the given DVR system is operatively coupled. As another example, the user may use a web browsing application executing on the personal computing device to interact with the account activation interface.

Through the account activation interface the service provider collects necessary information for creating an account record in the database for the user. Such information may include, for example, account credentials (e.g., username/password), contact information (e.g., an e-mail address), billing information, and the like. Once the necessary information is collected, the service provider can create an account record for the user in the service provider database(s).

To associate the account record created for the user with the identifiers of the DVR systems the user operates, the account activation interface may prompt the user to enter the identifiers of the DVR systems when activating the account. For example, the user may be prompted by the account activation interface to provide external serial numbers listed on the casings of the user's DVR systems. In conjunction with or after creating the account record, the service provider can link in the database the account record with the DVR system identifiers entered by the user.

In one possible embodiment, the registration process uses two identifiers for each DVR system. One identifier uniquely identifies the DVR system such as, for example, a serial number or other identifier assigned by the manufacturer of the DVR system. This identifier can be the same as the identifier discussed above that is obtained by the service provider at step 301 of process 300. The other identifier is assigned by the service provider to the DVR system before the DVR system is delivered to or purchased by a user. For the purpose of illustrating a clear example, the identifier of the DVR system obtained at step 301 is referred to as the manufacturer identifier and the other identifier assigned to the DVR system by the service provider is referred to as the service provider identifier. Both the manufacturer identifier and the service provider identifier uniquely identify the DVR system. The service provider maintains a mapping in the database(s) between manufacturer identifiers and service provider identifiers. Assigned service provider identifiers are affixed to or associated with the DVR systems before the DVR systems are delivered to or purchased by users. For example, assigned service provider identifiers may be printed on adhesive stickers which are affixed to the casing of DVR systems or printed in accompanying user manuals before the DVR systems are delivered to or purchased by users. The user is prompted to provide the service provider numbers of the user's DVR systems when activating an account by the account activation interface. Upon receiving the service provider numbers, the service provider consults the mapping it maintains to determine the manufacturer identifiers of the user's DVR systems. Having determining the manufacturer identifiers, the service provider can create associations between the manufacturer identifiers and the users' account record in the service provider database. In this way, a user's account record can be associated with the identifiers of the DVR systems operated by the user without the user having to obtain or know about the identifiers used by the service provider to identify the DVR systems.

The above is but one example of a possible DVR system registration process and other processes may be used. Significantly, by the culmination of the registration process, the service provider should have obtained the identifiers of the user's DVR systems and the user's account activation information from which an account record can be created for the user and an association made in the service provider database(s) between the account record and the identifiers of the user's DVR systems. Thus, after the registration process for all of a user's DVR systems, the service provider can determine the identifiers of the DVR systems operated by the user and for a given identifier of a DVR system, the service provider can determine the account record of the user that operates the given DVR system.

6.0 EXAMPLE PROGRAM GUIDE

Figure 4:
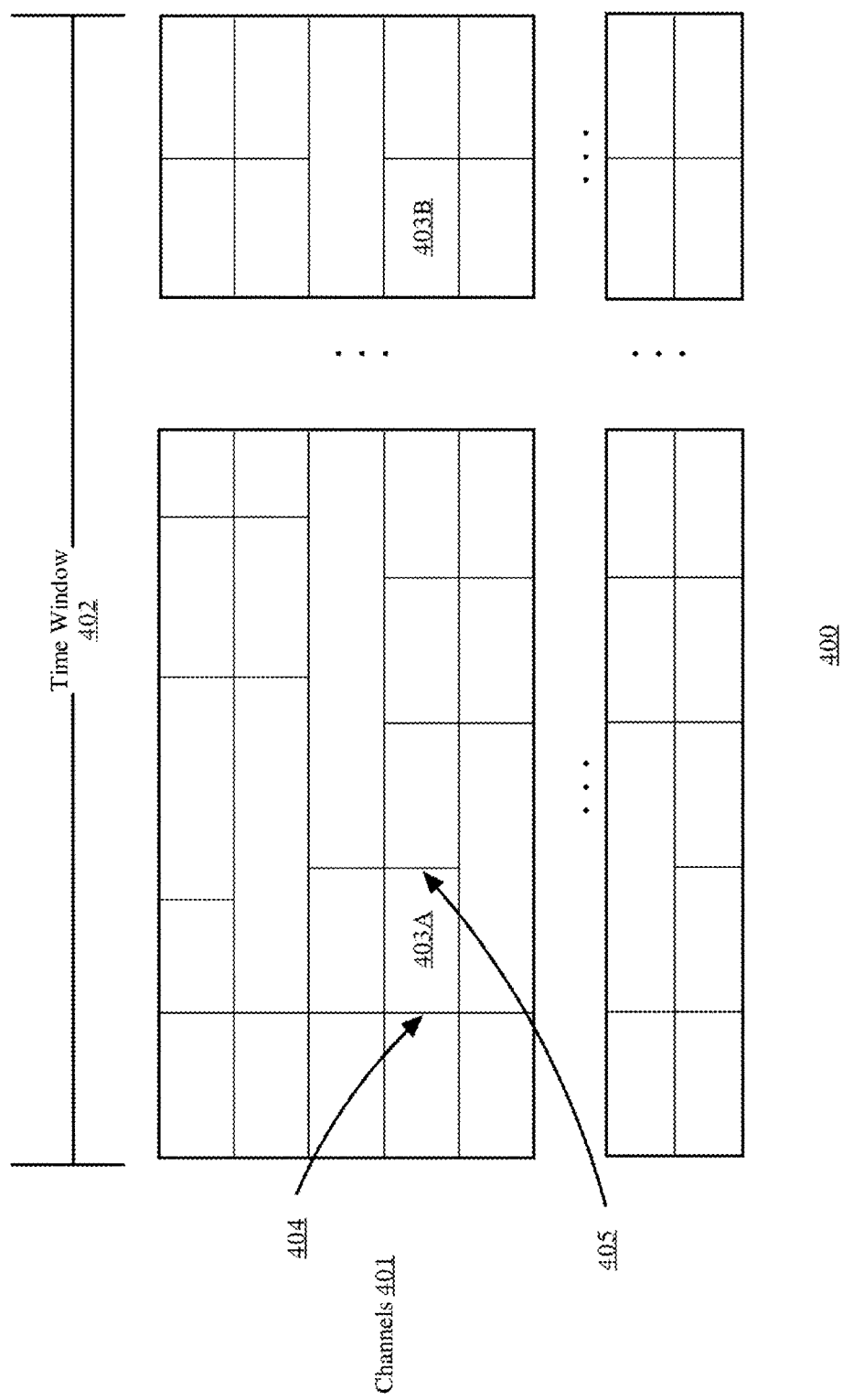
FIG. 4 is a block diagram and schematic illustration of an electronic program guide, according to a possible embodiment of the invention.

Referring now to FIG. 4, therein is shown a block diagram and schematic illustration of an electronic program guide 400 according to a possible embodiment of the invention. The service provider 105 may store data 112 in the database(s) 150 representing electronic program guides for content provider(s) 101. Each program guide provides information about multimedia programming and content offered by a content provider. In particular, each program guide specifies one or more channels 401 offered by the content provider and for each channel, the programming offered by the content provider during a time widow 402. Each program guide may also or alternatively provide information about multimedia programming and content offered by a content provider across a data network and accessible via a Uniform Resource Locator (URL), IP address, etc.

As used herein, the term "channel" refers broadly to any identifier capable of being used by a DVR system to select one multimedia program of many multimedia programs currently being offered by the content provider. For example, a channel 401 may correspond to a broadcast television, digital satellite television, or cable television channel number. As another example, a channel 401 may correspond to a URL or other web address.

As used herein, the term "multimedia program series" or just "program series" refers broadly to multimedia content offered by a content provider on one or more channels either as a one-time offering or on a periodic basis. For example, a multimedia program series may correspond to a television program, a television program series that includes a plurality of episodes, a webcast, a podcast, video content, audio content, etc. In the program guide 400, each program series is identified by a title and a unique program identifier.

An instance of a program series is referred to herein as an "episode". Program guide 400 segments channels 401 during the time window 402 into series of episodes. Each episode has a start time during the time window 402 and an end time during the time widow 302. For example, episode 403A has start time 404 and an end time 405. Each episode identifies the program series the episode is a part of, for example, through the program identifier or through the program title. Each episode may also be further identified by an episode identifier or an episode title.

When a program series is offered by a content provider on a periodic basis, the program guide 400 may indicate multiple episodes for the same program series. For example, episode 403A and episode 403B may be two episodes of the same program series. Episodes of a program series may be offered on multiple channels 401. For example, an episode for a program series may be offered on one channel in a high definition video format while offered on another channel in a regular definition video format.

The service provider may obtain or create program guides 400 on a periodic basis as programming information for content providers becomes available. Program guides 400 may be obtained by the service provider from one or more third-party television listing services. The length of the time window 402 for a program guide 400 is largely dictated by how often the content provider updates its programming schedule. A typical time widow 402 is two weeks in length. However, a time window 402 can be shorter, longer, list previous weeks or months of scheduling, etc.

The service provider 130 stores program guides 400 as program guide data 112 in database(s) 150. The service provider periodically (e.g., once a day, once every few days, etc.) communicates program guide data representing program guides to DVR systems 103. Each DVR system receives program guide(s) corresponding to the content provider(s) that provide multimedia programming to the DVR system's geographical location or service area. For example, if a DVR system receives multimedia content from a particular cable television provider, then the service provider provides program guide data for that particular cable television provider.

7.0 EXAMPLE OF CREATING A REPEAT RECORDING SCHEDULE

Figure 5:
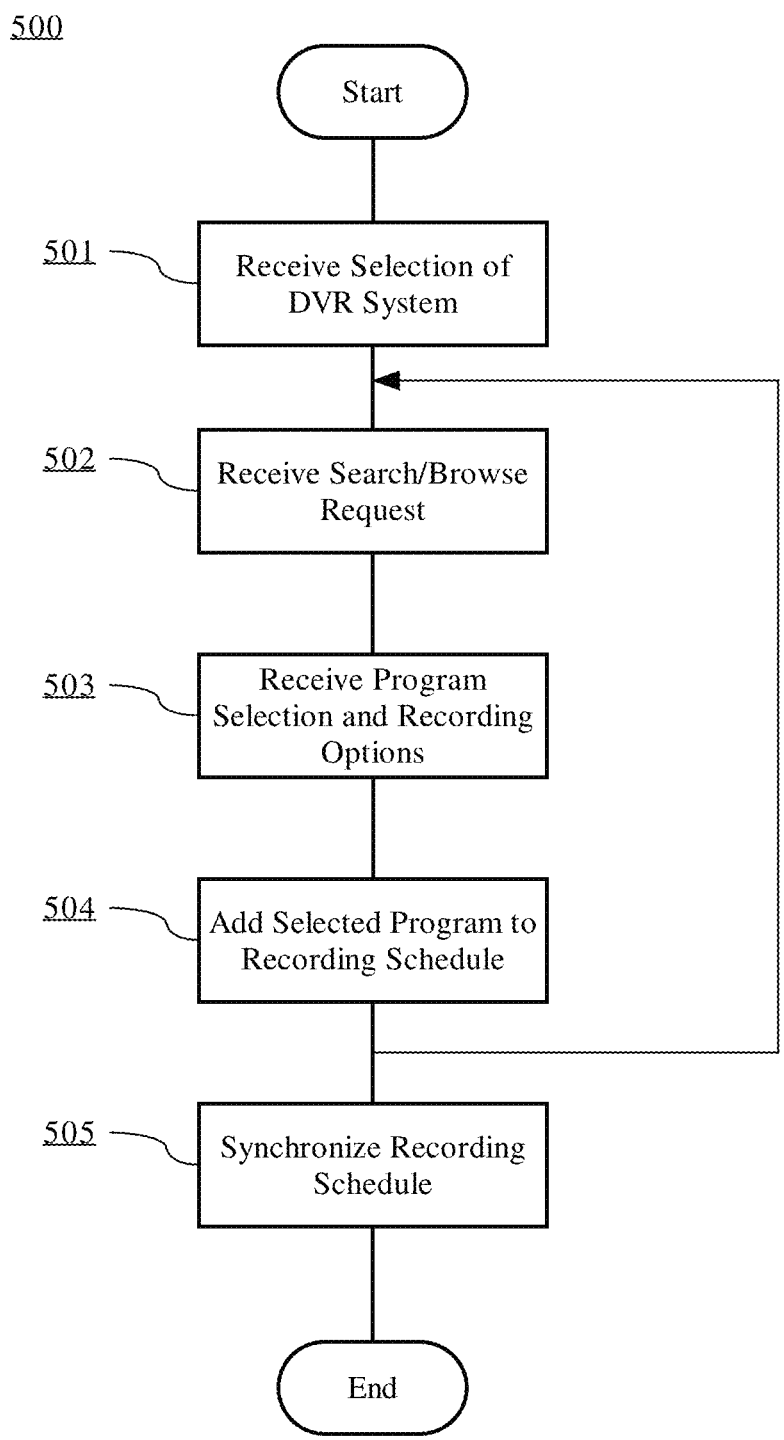
FIG. 5 is a flowchart illustrating steps for creating a repeat recording schedule for a DVR system, according to a possible embodiment of the invention.

Referring now to FIG. 5, therein is shown a flowchart of steps of a process 500 for creating a repeat recording schedule according to a possible embodiment of the invention. The process 500 is performed by logic (e.g., software) executed by one or more server(s) 106 of the service provider 105. The process is performed by the server logic in the context of user interface logic 108 driving a user interface displayed on a display device operatively coupled to a user 120's DVR system 103 or a personal computing device 104 of the user.

At step 501, the service provider logic receives a selection of a particular DVR system to configure with a repeat recording schedule (e.g., from a user via a web interface over the Internet, via a handheld device using a wireless or cellular connection, etc.). If the user has registered multiple DVR systems with the service provider, then the service provider logic may receive the selection in response to the user selecting one of the multiple DVR systems through the user interface. If the user has registered only one DVR system with the service provider, then the service provider logic may receive the selection of the one DVR system as a default selection. Alternatively, the service provider logic may receive the selection of the one DVR system after the user has been prompted through the user interface to confirm configuration of the one DVR system with a repeat recording schedule.

In response to receiving the selection of a particular DVR system, the service provider logic determines the identifier of the particular DVR system from the database(s) 150 for use in handling subsequent requests regarding creating the repeat recording schedule for the particular DVR system.

At step 502, the service provider logic receives a request to search or browse program guide(s) 112 for the selected DVR system for a program series or multiple program series of interest for recording on a repeat basis. The program guide(s) 112 for the selected DVR system can be identified by the service provider logic using the selected DVR system's identifier. For example, the database(s) 150 may store data association(s) between the selected DVR system's identifier and the program guide(s) 112 for the selected DVR system. The search or browse request may be received in response to the user submitting search or browse criteria to the service provider logic through the user interface. For example, the user interface may facilitate a keyword search for programs by program title. As another example, the user interface may facilitate browsing listings of programs by program series title. In response to receiving the search or browse request, the service provider logic searches the program guide(s) 112 for the selected DVR system to identify a program series or multiple program series in the program guide(s) that match the submitted search or browse criteria. Matching program(s) are returned to the user interface.

In one possible embodiment, matching program series are presented to the user on the user interface as a set of search or browse results. Each result in the set corresponds to a matching program series. In one possible embodiment, each result indicates the title of the matching program series and the channel that the matching program series is available on. If a program series is available on multiple channels, then the search results may include multiple results for that program series.

At step 503, the service provider logic receives a selection of a particular program series-channel combination of interest for recording on a repeat basis. For example, the selection may be received in response to the user selecting one of the matching results presented as a search or browse results in the user interface.

Along with or after receiving the selection of the particular program series, the service provider may also receive one or more recording options. These recording options may be selected by the user through the user interface. In one possible embodiment, the recording options available for selection and configuration by the user include "recording quality", "record", "keep at most", "keep until", "start recording", "stop recording", etc.

The "recording quality" option allows the user to specify the quality (e.g., basic, medium, high, or best) of the recording by the DVR system when recording episodes of the selected program series. A higher quality recording generally provides a better playback experience when viewing a recorded episode at the expense of requiring more storage space of the DVR system to store the recorded episode. This is because a higher quality recording is made at a higher bit-rate than a lower quality recording.

The "record" option allows the user to specify whether only new episodes of the program series offered on the channel are recorded by the selected DVR system or whether new and repeat episodes of the program series offered on the channel are recorded by the selected DVR system. In one possible embodiment, indication of whether an episode of a program series offered on a channel is a new episode or a repeat episode is provided in the program guide data.

The "keep at most" option allows the user to specify a maximum number of episodes of the selected program series to record. The DVR system will delete oldest or lower priority recorded episodes of the program series when making a new recording of an episode of the program series. For example, if the user specifies two (2) for the "keep at most" option, the first episode of the program series will be deleted by the DVR system when the third episode of the program series is recorded by the DVR system.

In one possible embodiment, the "keep at most" option operates in conjunction with the "keep until" option. If the "keep until" option is set to "when space needed" as described below, the most recently recorded episodes will be kept, as described above, when a new recording is made. If the "keep until" option is set to "keep until delete" as described below, all episodes of the program series will be kept when a new recording is made until the "keep at most" limit is reached. For example, if the "keep at most" option is set to three (3) episodes and the "keep until" option is set to "keep until delete", then the DVR system will stop recording episodes of the program series after three episodes of the program series have been recorded until the user deletes one or more of the three recorded episodes.

The "keep until" option allows the user to specify when recorded episodes are deleted by the DVR system. In one possible embodiment, the "keep until" option can assume two values: "when space needed" or "keep until delete". If the "keep until" option is set to "when space needed", the oldest recorded episodes of a program series will be deleted by the DVR system as space is needed for new recordings. If the "keep until" option is set to "keep until delete", all recorded episodes are saved until the user manually deletes.

The "start recording" option allows the user to specify that the DVR system should start recording an episode of the selected program series before the episode is scheduled to begin (e.g., 1, 2, 3, 4, 5, . . . 10, etc., minutes prior—any number of minutes and/or hours prior). The "stop recording" option allows the user to specify that the DVR system should stop recording an episode of the selected program series after the scheduled end of the program (e.g., 1, 2, 5, 15, 30 minutes, 1 hour, 1.5 hours, or 3 hours after, etc.—any number of minutes and/or hours after).

At step 504, the service provider logic adds the selected program series and selected recording options to the repeat recording schedule 111 for the selected DVR system. In one possible embodiment, the repeat recording schedule for the DVR system comprises an ordered listing of program identifier-channel tuples. The program identifier and channel of a selected program series may be determined from the program guide from which the program of interest was selected.

In one possible embodiment, the repeat recording schedule is prioritized to resolve a recording concurrency conflict amongst repeat recordings. In general, a recording concurrency conflict arises when a DVR system configured with a repeat recording schedule is configured to concurrently record more episodes than it is capable of concurrently recording. Concurrent recording capability of a DVR system may be limited by the inherent computing processing power of the DVR system or the number of tuners or inputs the DVR system is configured with.

In one possible embodiment, when a recording concurrency conflict arises, the DVR system will record the episode of the program series with the higher priority according to the repeat recording schedule and will clip the recording (e.g., start the recording after the higher priority recording completes) of the episode of the program series with the lower priority.

In one possible embodiment in which two concurrently conflicting episodes overlap by only a few minutes, recording of the lower priority episode is canceled. For example, if an episode of a lower priority program series ends at 8:33 while an episode of a higher priority program series begins at 8:30, then the recording of the lower priority episode will be canceled at 8:30 so that recording of the higher priority episode can then begin.

Steps 502, 503, and 504 may be repeated if the user desires to add more program series to the repeat recording schedule of the selected DVR system.

At step 505, service provider logic synchronizes the copy of the repeat recording schedule 111 stored in the database(s) 150 with the copy of the repeat recording schedule stored on the selected DVR system. In one possible embodiment, the synchronization is bi-directional such that superseding changes made to the copy of the repeat recording schedule at the DVR system are incorporated into the copy of the repeat recording schedule 111 in the service provider database(s) 150 and superseding changes made to the copy of the repeat recording schedule 111 in the service provider database(s) 150 are incorporated into the copy of the repeat recording schedule at the DVR system. Any number of techniques may be used to detect superseding changes when synchronizing the copies of the repeat recording schedules including use of change timestamps, vector clocks, etc. Synchronization of the copies may be initiated by DVR system or the service provider. In one possible embodiment, synchronization of the copies includes one of the DVR system or the service provider initiating and establishing a TCP connection to the other. Synchronization may occur periodically for example in response to every user initiated change to a copy of the repeat recording schedule.

In one possible embodiment, after the copies of the repeat recording schedule have been synchronized, both the copy of the schedule at DVR system and the copy of the schedule in the service provider database(s) 150 are the same. That is, both copies list the same program-channel combinations in the same priority ordering. The bi-directional synchronization ability allows the user to configure a DVR system with a repeat recording schedule even if the data connection between the DVR system and the service provider is temporarily unavailable. For example, if the data connection is temporarily unavailable, the user can make changes to the DVR system's copy of the repeat recording schedule using controls of the DVR system. When the data connection is reestablished, those changes may be synchronized with the copy of the repeat recording schedule for the DVR system stored in the service provider database(s) 150.

In one possible embodiment, the bi-directional synchronization ability allows the user to configure a DVR system with a repeat recording schedule even if the user does not have physical access to the DVR system. For example, using a web browsing application on a personal computing device, the user can interact with the user interface logic 108 of the service provider to configure a repeat recording schedule for the DVR system from anywhere the personal computing device can establish a data connection with the service provider. For example, if the user is waiting for an airplane flight in an airport terminal, the user may be able to configure his home DVR system with a repeat recording schedule at the airport by accessing the service provider web interface through an Internet connection between a mobile device of the user and the service provider.

8.0 EXAMPLE OF CREATING A REPEAT RECORDING SCHEDULE FOR A DVR SYSTEM BASED ON ANOTHER REPEAT RECORDING SCHEDULE FOR ANOTHER DVR SYSTEM

Figure 6:
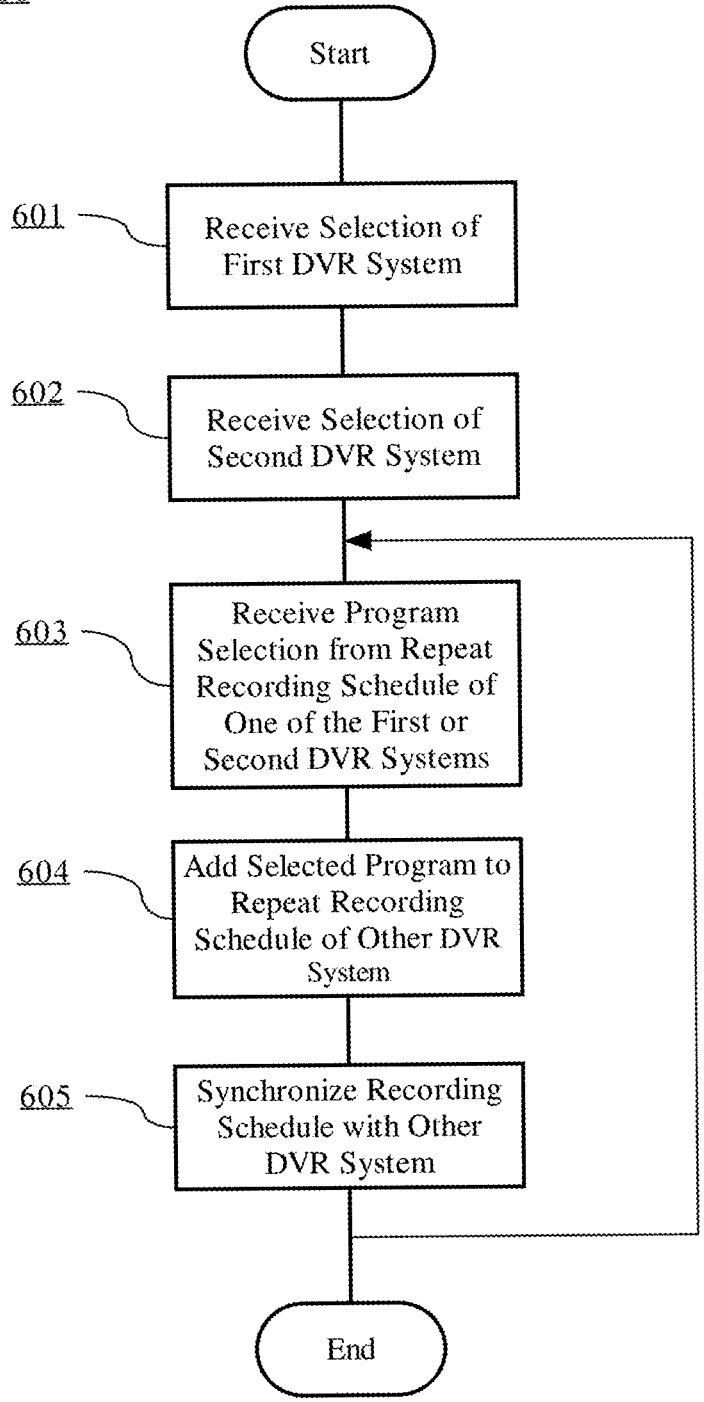
FIG. 6 is a flowchart illustrating steps for creating a repeat recording schedule for a DVR system based on an another repeat recording schedule created for another DVR system, according to a possible embodiment of the invention.

Referring now to FIG. 6, therein is shown a flowchart of steps of a process 600 for creating a repeat recording schedule for a DVR system (Target DVR system) based on an another repeat recording schedule created for another DVR system (Source DVR system), according to a possible embodiment of the invention. The process is performed by logic (e.g., software) executed by one or more server(s) 106 of the service provider 105. The process is performed by the server logic in the context of user interface logic 108 driving a user interface displayed on a display device operatively coupled to a user 120's DVR system 103 or a personal computing device 104 of the user.

In one possible embodiment, process 600 is performed in the context of a user upgrading an existing DVR system with a new DVR system. In this embodiment, both the existing DVR system and the new DVR system may be operatively coupled to the service provider via a data network. The user interacts with the user interface logic 108 of the service provider server 105 to copy repeat recording requests from the repeat recording schedule 111 of the existing DVR system to the repeat recording schedule 111 of new DVR system. Note that the process described herein may also apply to other features of the DVR system, e.g., user preferences, user viewing preferences, user viewing history, system settings, predictive recording data, etc.

At step 601, the service provider logic receives a selection of a first DVR system. The selection may be received in response to the user selecting one of the user's multiple registered DVR systems through a user interface (e.g., a web page, etc.) caused to be presented to the user by user interface logic 108. In response to receiving the selection of the first DVR system, the service provider logic reads the current repeat recording schedule 111 for the first DVR system from the database(s) 109 and returns the repeat recording schedule 111 to the requesting entity to be presented on the user interface. Alternatively, the service provider logic may retrieve the repeat recording schedule 111 directly from the first DVR system.

At step 602, the service provider logic receives a selection of a second DVR system. The selection may be received in response to the user selecting one of the user's multiple registered DVR systems through a user interface (e.g., a web page, etc.) caused to be presented to the user by user interface logic 108. In response to receiving the selection of the second DVR system, the service provider logic reads the current repeat recording schedule 111 for the second DVR system from the database(s) 109 and returns the repeat recording schedule 111 to the requesting entity to be presented on the user interface. Alternatively, the service provider logic may retrieve the repeat recording schedule 111 directly from the second DVR system.

Figure 7A:
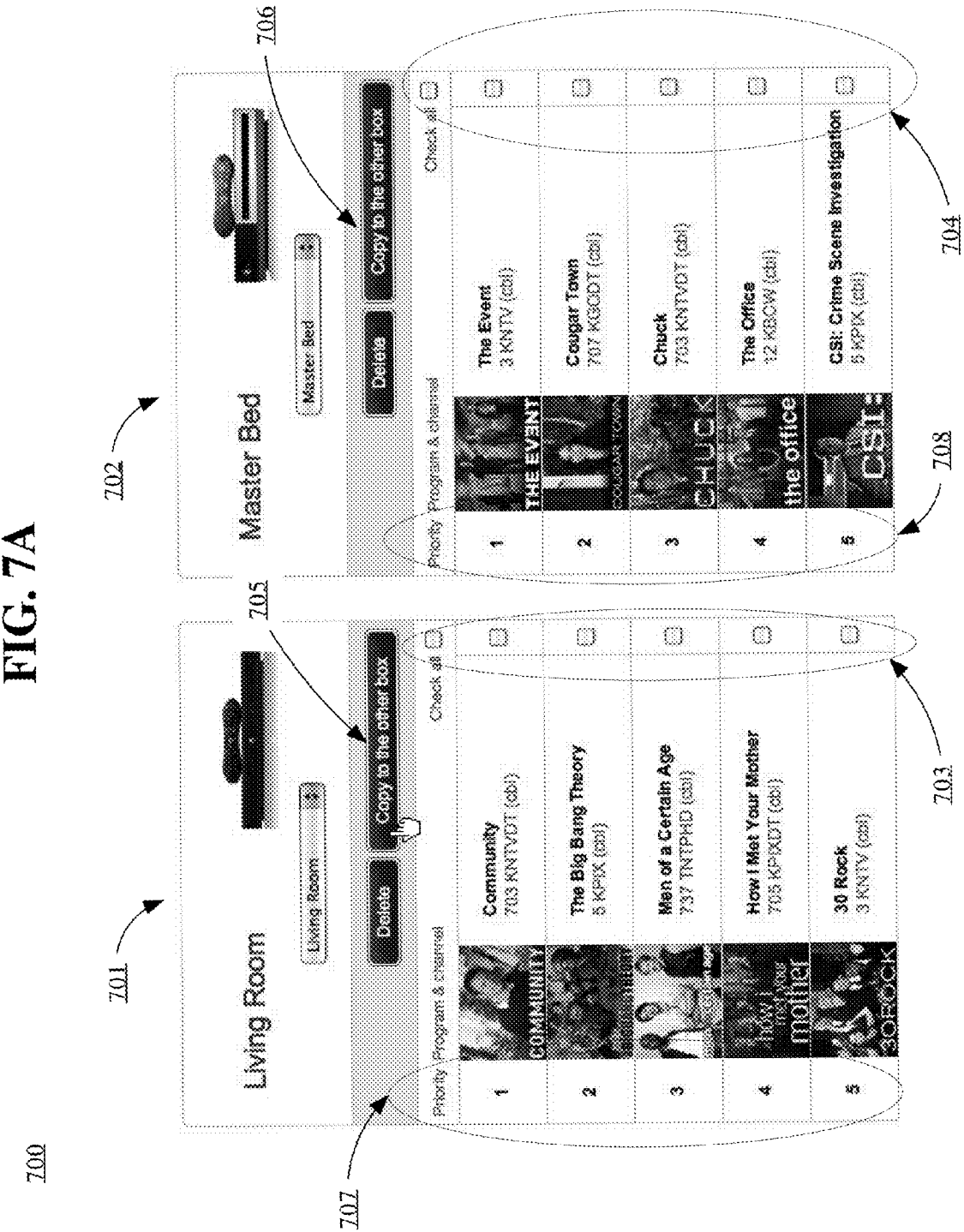
FIGS. 7A and 7B depict a user interface for creating a repeat recording schedule for a DVR system based on another repeat recording schedule created for another DVR system, according to a possible embodiment of the invention.

Referring to FIG. 7A, therein is shown an exemplary user interface 700 presenting a current repeat recording schedule 111 for a first DVR system 701 of a user's multiple DVR systems and a current repeat recording schedule 111 for a second DVR system 702 of the user's multiple DVR systems.

As shown in FIG. 7A, the program series currently on a particular DVR system's repeat recording schedule may be presented on the user interface in an order based on the associated program recording priorities. For example, the repeat recording schedule of the first DVR system 701 currently has the program series "Community" on channel 703 as the highest priority followed by the program series "The Big Bang Theory" on channel 5 as the next highest priority, etc. The priorities associated with the program series currently on system 701's repeat recording schedule are listed in decreasing priority order (numerically increasing order) in the "Priority" column 707 of the user interface 700. The priorities associated with the program series currently on the system 702's repeat recording schedule are listed in decreasing priority order (numerically increasing order) in the "Priority" column 708 of the user interface 700.

In one possible embodiment, priorities of the program series on a system's repeat recording schedule can be reordered through user interface 700. For example, the user may change the priority of a program series by clicking and dragging a user interface item representing the program series up or down the list of items and releasing at the desired priority location. The other items in the list are accordingly assigned new priorities. For example, referring to the user interface 700, a user may click and drag the user interface item corresponding to the program series "The Event" on channel 3. If the user releases the item between the items corresponding to the two program series "Chuck" on channel 703 and "The Office" on channel 12, then "The Event" on channel 3 would be reassigned a priority of 3, "Cougar Town" on channel 707 would be reassigned a priority of 1, "Chuck" on channel 703 would be reassigned a priority of 2.

In one possible embodiment, a user may delete a program series from a system's repeat recording schedule through the user interface 700. To do so, the user may individually select one or more program series to delete using the checkboxes next to the corresponding user interface items. Alternatively, the user may designate all program series to be deleted using the "Check all" checkbox. Once the one or more program series to delete have been selected, the user may select the "Delete" button for the corresponding repeat recording schedule which causes the selected program series to be removed the repeat recording schedule 111.

In one possible embodiment, when a repeat recording schedule 111 for a DVR system is modified through the user interface logic 108 either by reordering priorities or by deleting program series, the resulting changes to the repeat recording schedule 111 is synchronized with the system's copy of the repeat recording schedule as a result of a subsequent bi-directional synchronization operation performed by the schedule management logic 107 and the DVR system.

Figure 7B:
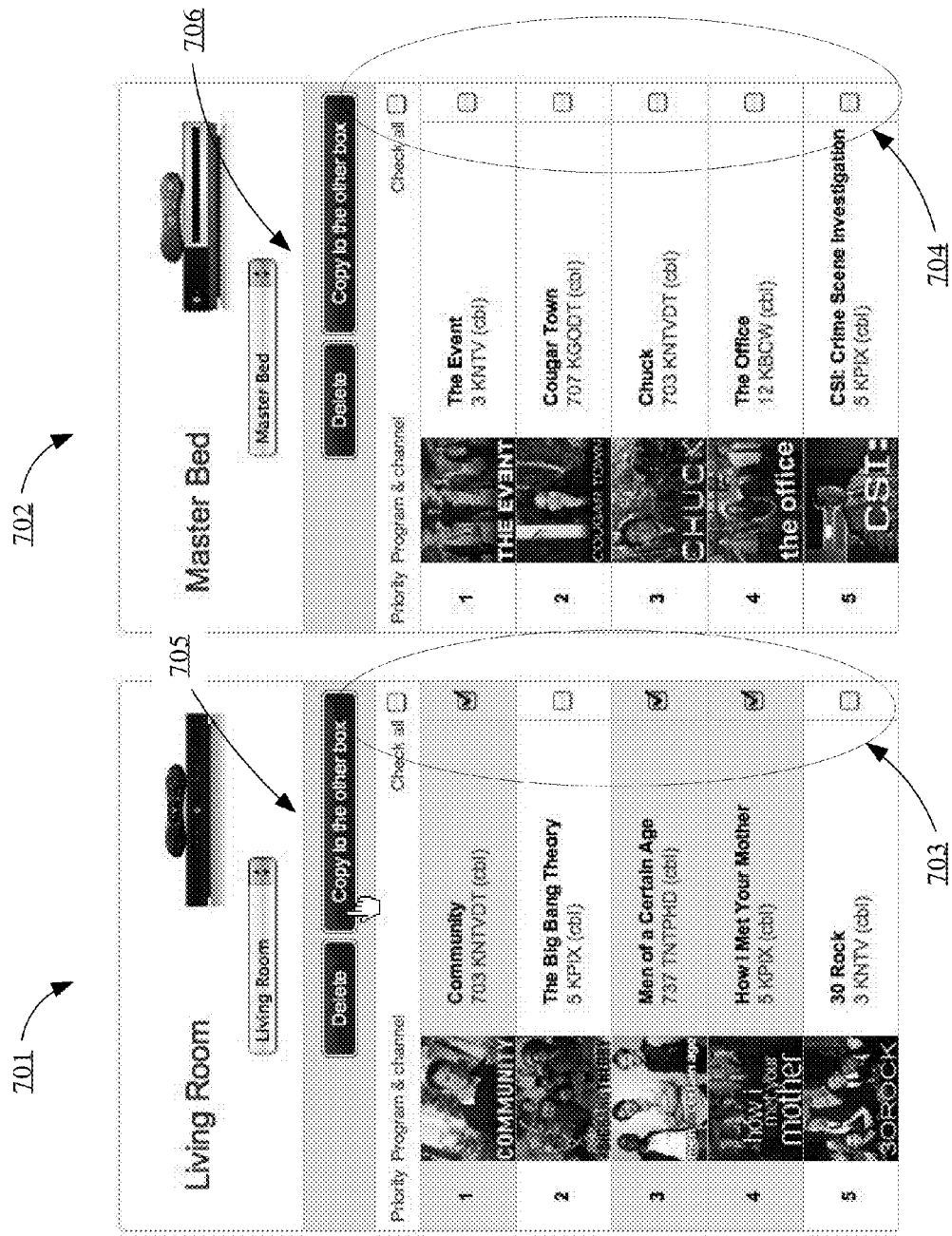

The first DVR system 701 and the second DVR system 702 represent DVR systems that the user wishes to copy repeat recording requests between. In the example depicted in FIG. 7, the first DVR system 701 is located in the user's living room while the second DVR system 702 is located in the user's master bedroom.

As shown, the user interface 700 provides a set of checkboxes 703 whereby the user can select one or more or all of the repeat recording requests of the current repeat recording schedule 111 for the first DVR system 701. The user interface 700 provides another set of checkboxes 704 whereby the user can select one or more or all of the repeat recording requests of the current repeat recording schedule 111 for the second DVR system 702. The user interface 700 also provides a button 705 for copying selected repeat recording requests from the repeat recording schedule 111 for the first DVR system 701 to the repeat recording schedule 111 for the second DVR system 702. There is also a button 706 for copying selected repeat recording requests from the repeat recording schedule 111 for the second DVR system 702 to the repeat recording schedule 111 for the first DVR system 701. Thus, bi-directional copying is facilitated. In the example depicted in FIG. 7B, some of the repeat recording request from the current repeat recording schedule for the first DVR system 701 have been selected. The selections are indicated with a check in the correspond checkboxes 703.

At step 603, the service provider logic receives a request to copy one or more selected repeat recording requests from the repeat recording schedule of the first or second DVR systems (source DVR system) to the other of the first or second DVR systems (target DVR system). For example, in the example depicted by FIG. 7B, the user has selected to copy the repeat recording requests for "Community", "Men of a Certain Age", and "How I Met Your Mother" from the repeat recording schedule for "Living Room" DVR system 701 to the repeat recording schedule for the "Master Bed" DVR system 702. In response to the user activating the copy button 705, the service provider logic receives the copy request.

In the case where the source DVR system uses the same program guide(s) 112 as the target DVR system, the selected repeat recording requests from the source DVR system's repeat recording schedule can be copied directly to the target DVR's repeat recording schedule. This is because the program identifiers and channels of the selected programs will be the same in both systems' program guide(s) 112.

In the case where the source DVR system uses a different program guide 112 from the target DVR system, in response to receiving the copy request at step 603, the service provider logic searches the program guide(s) 112 of the target DVR system for episodes that correspond to the one or more program series selected from the source DVR system's repeat recording schedule. This search may be made based on one or more of the program identifiers and the program titles of the selected one or more program series. Typically, the same program series is identified by the same program identifier across different program guide(s) 112, even if the program is offered on different channels. For example, in the example of FIG. 7B, the service provider logic could search the program guide(s) 112 for the "Master Bed" target DVR system 702 for episodes that refer to program identifiers equal to the program identifiers for the program series "Community", "Men of a Certain Age", and "How I Met Your Mother" as specified in the "Living Room" source DVR system's 701 repeat recording schedule. In situations where consistent program identifiers are not used, the program title may be used to identify program series in the target DVR system's program guide(s) 112. For example, the service provider logic could search the program guide(s) 112 for the "Master Bed" target DVR system 702 for episodes with the program series title of "Community", "Men of a Certain Age", or "How I Met Your Mother".

In one possible embodiment, if at least one episode is identified in the program guide(s) 112 of the target DVR system that is associated with a program series that matches a selected program series to be copied, then the user is prompted in the user interface to confirm the addition of the program to the target DVR system's repeat recording schedule. If more than one episode is identified for the same program series but on different channels, the user may be prompted to confirm the addition of some or all of the program series-channel combinations. For example, a selected program series may be provided by a content provider to the source DVR system on only a standard definition channel while provided to the target DVR system by a content provider on a standard definition channel and a high-definition channel. In this example, the user may be prompted to confirm the addition of one or both of the program series on the standard definition channel and the program series on the high definition channel to the target DVR system's repeat recording schedule.

At step 604, one or more of the program series identified in the target DVR system's program guide(s) 112 that match or correspond to the program series selected from the source DVR system's repeat recording schedule 111 are added to the target DVR system's repeat recording schedule 111. The program identifier and channel of a selected program series to be copied that is added to the repeat recording schedule 111 for the target DVR system may be determined by the service provider logic from the program guide(s) 112 for the target DVR system from which the episode(s) of the program series to be copied were identified. After the target DVR system's repeat recording schedule 111 has been created or updated, the new repeat recording schedule 111 for the target DVR system may be presented on the user interface so that the user can arrange the priorities (e.g., by clicking and dragging a program up or down the list and releasing at the desired priority location, etc.) of the repeat recording requests according to the user's preferences.

At step 605, the service provider logic synchronizes the copy 111 of the repeat recording schedule for target DVR system with the copy of the repeat recording schedule stored at the target DVR system.

Steps 603, 604, and 605 may be repeated if the user desires to copy more program series from the repeat recording schedule of the source DVR system to the repeat recording schedule of the target DVR system. Steps 603, 604, and 605 may be performed where a first system is the source DVR system and a second system of the target DVR system and then performed again where the second system is the source DVR system and the first system is the target DVR system. For example, referring to FIG. 7A, steps 603, 604, and 605 may be performed where system 701 is the source DVR system and system 702 is the target DVR system and then performed against where system 701 is the target DVR system and system 702 is the source DVR system.

9.0 EXAMPLE OF PREVENTING CONCURRENT RECORDING CONFLICTS

Figure 8:
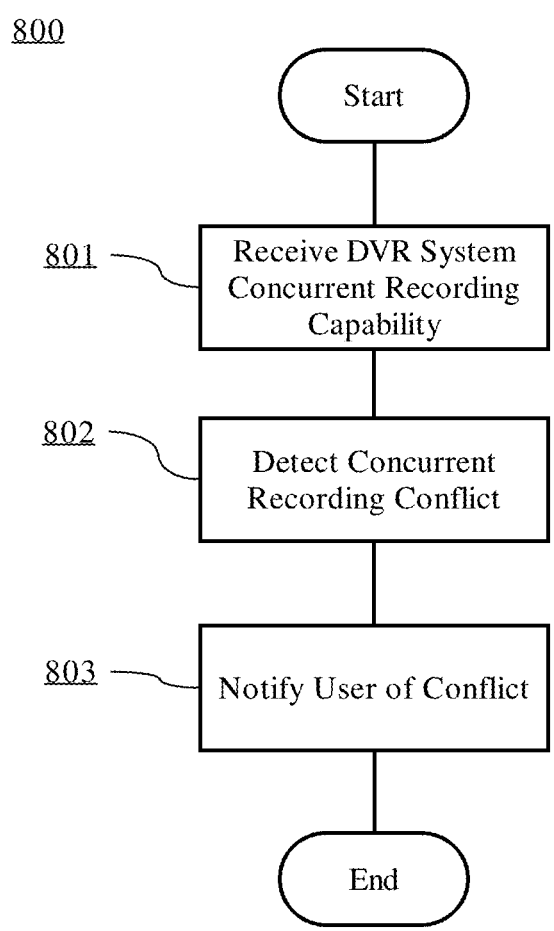
FIG. 8 is a flowchart illustrating steps for preventing a concurrent recording conflict, according to a possible embodiment of the invention.

Referring now to FIG. 8, therein is shown a flowchart of steps of a process 800 for preventing a concurrent recording conflict, according to a possible embodiment of the invention. In general, a concurrent recording conflict arises when a DVR system is scheduled according to its repeat recording schedule to concurrently record from more channels and/or inputs than the DVR system is capable of recording from at the same time. The DVR system may be limited in the number of channels and/or inputs it can concurrently record from by the processing power and capabilities of the DVR system. For example, a DVR system with only two tuners may only be able to record from the two channels simultaneously. In the event of a concurrent recording conflict, the DVR system may consult its repeat recording schedule to determine which of the conflicting program series is of lowest priority according the repeat recording schedule. Episodes of program series with the lowest priority are not recorded in favor of concurrent episodes of higher priority program series.

In one possible embodiment, to prevent such a concurrent recording conflict from arising at a particular DVR system 103 in the first place, the service provider logic at step 801 receives or obtains information about the particular DVR system's concurrent recording capability and stores the information in association with the DVR system's identifier in the service provider database(s) 150.

In one possible embodiment, the received or obtained information comprises a number indicating the number of channels and/or inputs that the particular DVR system can concurrently record from. This number may correspond, for example, to the number of tuners of the particular DVR system.

In one possible embodiment, DVR systems 103 periodically report concurrent recording capability information to the service provider over a data network.

At step 802, the service provider logic detects a concurrent recording conflict for the particular DVR system. In one possible embodiment, the service provider logic detects a concurrent recording conflict before attempting to add a repeat recording request to the particular DVR system's repeat recording schedule 111. To detect the conflict, the service provider logic analyzes the program guide(s) 112 for the particular DVR system to identify the start and end times of all episodes of the program to be added to the particular DVR system's repeat recording schedule 111. The service provider logic compares these blocks of time with the start and end times of all episodes of the one or more program series that are currently listed in the particular DVR systems' repeat recording schedule 111. The start and end times of all episodes of programs that are currently listed in the particular DVR system's repeat recording schedule 111 can be determined from the program guide(s) 112 for the particular DVR system. If there is a time overlap between an episode of the program series to be added and an episode of a program series already listed in the particular DVR system's repeat recording schedule 111, then a conflict exists. If the number of overlapping episodes including the episode of the program series to be added exceeds the concurrent recording capability of the particular DVR system, then the service provider logic detects the addition of the program to the particular DVR system's repeat recording schedule 111 as presenting a concurrent recording conflict.

In one possible embodiment, the time window over which conflicts may be detected is limited by the time windows 402 of the program guide(s) 112 for the particular DVR system. For example, if the time window 402 is two weeks in length, then the service provider logic may only detect concurrent recording conflicts within the two week window.

In one possible embodiment, if episodes overlap by only a few minutes (e.g., less than five minutes), then the overlap is not considered to present a concurrent recording conflict. In this embodiment, the particular DVR system may clip the recording of one of the overlapping episodes so that recording of another episode can begin. For example, if an episode of the program series to be added ends three minutes after an episode of a program series already listed in the particular DVR system's repeat recording schedule 111 starts, this overlap may not be detected as a concurrent recording conflict because the particular DVR system may stop recording the episode of the program series to be added three minutes before it ends or not begin recording the other episode until three minutes after that episode starts.

At step 803, the user is notified of the concurrent recording conflict. For example, in response to a request by the user to add a selected program series to a repeat recording schedule 111 for a particular DVR system, the service provider logic may notify the user through the user interface logic 108 that the addition of the selected program would present a concurrent recording conflict. Upon receiving such notification that user may decide not to schedule the selected program as originally requested. For example, the user may select another of the user's DVR systems to record the selected program series by adding the selected program to the repeat recording schedule 111 of the other system. As another example, the user may prioritize the selected program series higher than the conflicting program series in the particular DVR system's repeat recording list to ensure that episodes of the selected program series are recorded by the particular DVR system.

10.0 EXAMPLE COMPUTING DEVICE

According to one possible embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 9 is a block diagram that illustrates a computer system 900 upon which a possible embodiment of the invention may be implemented. Computer system 900 includes a bus 902 or other communication mechanism for communicating information, and a hardware processor 904 coupled with bus 902 for processing information. Hardware processor 904 may be, for example, a general purpose microprocessor.

Computer system 900 also includes a main memory 906, such as a random access memory (RAM) or other dynamic storage device, coupled to bus 902 for storing information and instructions to be executed by processor 904. Main memory 906 also may be used for storing temporary variables or other intermediate information during execution of instructions to be executed by processor 904. Such instructions, when stored in non-transitory storage media accessible to processor 904, render computer system 900 into a special-purpose machine that is customized to perform the operations specified in the instructions.

Computer system 900 further includes a read only memory (ROM) 908 or other static storage device coupled to bus 902 for storing static information and instructions for processor 904. A storage device 910, such as a magnetic disk or optical disk, is provided and coupled to bus 902 for storing information and instructions.

Computer system 900 may be coupled via bus 902 to a display 912, such as a cathode ray tube (CRT), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

Computer system 900 may implement the techniques described herein using customized hard-wired logic, one or more ASICs or FPGAs, firmware and/or program logic which in combination with the computer system causes or programs computer system 900 to be a special-purpose machine. According to one possible embodiment, the techniques herein are performed by computer system 900 in response to processor 904 executing one or more sequences of one or more instructions contained in main memory 906. Such instructions may be read into main memory 906 from another storage medium, such as storage device 910. Execution of the sequences of instructions contained in main memory 906 causes processor 904 to perform the process steps described herein. In alternative possible embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 910. Volatile media includes dynamic memory, such as main memory 906. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 902. Transmission media can also take the form of acoustic or light waves, such as those generated during radio-wave and infra-red data communications.

Various forms of media may be involved in carrying one or more sequences of one or more instructions to processor 904 for execution. For example, the instructions may initially be carried on a magnetic disk or solid state drive of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card, cable modem, satellite modem, or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are example forms of transmission media.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918.

The received code may be executed by processor 904 as it is received, and/or stored in storage device 910, or other non-volatile storage for later execution.

11.0 EXTENSIONS AND ALTERNATIVES

At this point, it should be noted that although the invention has been described with reference to specific possible embodiments, it should not be construed to be so limited. Various modifications may be made by those of ordinary skill in the art with the benefit of this disclosure without departing from the spirit of the invention. Thus, the invention should not be limited by the specific possible embodiments used to illustrate it but only by the scope of the issued claims.

What is claimed is:

1. A method comprising:
    causing a display of a first program series recording schedule for a first digital video recorder (DVR) system, the first program series recording schedule including one or more multimedia program series that is scheduled for the first DVR to record on an ongoing basis;
    causing a display of a second program series recording schedule for a second DVR system concurrently with the display of the first program series recording schedule for the first DVR system;
    receiving input indicating selection of a multimedia program series recording item in the first program series recording schedule for the first DVR system;
    adding the multimedia program series recording item to the second program series recording schedule for the second DVR system;
    updating the display of the second program series recording schedule for the second DVR system to include a display of the multimedia program series recording item in the second recording schedule.

2. The method of claim 1, further comprising:
    sending data representing the multimedia program series recording item to the second DVR system;
    receiving a confirmation from the second DVR system that the multimedia program series recording item has been added to a client-side instance of the second program series recording schedule, the client-side instance of the second program series recording schedule being stored on the second DVR system.

3. The method of claim 2, wherein the display of the second program series recording schedule for the second DVR system is updated to include the display of the multimedia program series recording item in the second recording schedule in response to receiving the confirmation from the second DVR system that the multimedia program series recording item has been added to the client-side instance of the second program series recording schedule.

4. The method of claim 1, further comprising:
    synchronizing a server-side instance of the second program series recording schedule with a client-side instance of the second program series recording schedule resulting in adding the multimedia program series recording item in the client-side instance of the second program series recording schedule;
    wherein the client-side instance of the second program series recording schedule is a data component of the second DVR system.

5. The method of claim 1, further comprising: in response to receiving search criteria, searching a program guide to identify one or more multimedia programs that satisfy the search criteria.

6. The method of claim 1, further comprising: establishing a network connection with the second DVR system and sending data representing the multimedia program series recording item to the second DVR system over the network connection.

7. A non-transitory computer-readable medium storing instructions which, when executed by one or more computing devices, causes the one or more computing devices to perform:
    causing a display of a first program series recording schedule for a first digital video recorder (DVR) system, the first program series recording schedule including one or more multimedia program series that is scheduled for the first DVR to record on an ongoing basis;
    causing a display of a second program series recording schedule for a second DVR system concurrently with the display of the first program series recording schedule for the first DVR system;
    receiving input indicating selection of a multimedia program series recording item in the first program series recording schedule for the first DVR system;
    adding the multimedia program series recording item to the second program series recording schedule for the second DVR system;
    updating the display of the second program series recording schedule for the second DVR system to include a display of the multimedia program series recording item in the second recording schedule.

8. The medium of claim 7, wherein the instructions comprise further instructions which, when executed by one or more computing devices, causes the one or more computing devices to perform:
    sending data representing the multimedia program series recording item to the second DVR system;
    receiving a confirmation from the second DVR system that the multimedia program series recording item has been added to a client-side instance of the second program series recording schedule, the client-side instance of the second program series recording schedule being stored on the second DVR system.

9. The medium of claim 8, wherein the display of the second program series recording schedule for the second DVR system is updated to include the display of the multimedia program series recording item in the second recording schedule in response to receiving the confirmation from the second DVR system that the multimedia program series recording item has been added to the client-side instance of the second program series recording schedule.

10. The medium of claim 7, wherein the instructions comprise further instructions which, when executed by one or more computing devices, causes the one or more computing devices to perform:
    synchronizing a server-side instance of the second program series recording schedule with a client-side instance of the second program series recording schedule resulting in adding the multimedia program series recording item in the client-side instance of the second program series recording schedule;
    wherein the client-side instance of the second program series recording schedule is a data component of the second DVR system.

11. The medium of claim 7, wherein the instructions comprise further instructions which, when executed by one or more computing devices, causes the one or more computing devices to perform: in response to receiving search criteria, searching a program guide to identify one or more multimedia programs that satisfy the search criteria.

12. The medium of claim 7, wherein the instructions comprise further instructions which, when executed by one or more computing devices, causes the one or more computing devices to perform: establishing a network connection with the second DVR system and sending data representing the multimedia program series recording item to the second DVR system over the network connection.

13. An apparatus comprising:
- a device, at least in part implemented in hardware, that causes a display of a first program series recording schedule for a first digital video recorder (DVR) system, the first program series recording schedule including one or more multimedia program series that is scheduled for the first DVR to record on an ongoing basis;
- a device, at least in part implemented in hardware, that causes a display of a second program series recording schedule for a second DVR system concurrently with the display of the first program series recording schedule for the first DVR system;
- a device, at least in part implemented in hardware, that receives input indicating selection of a multimedia program series recording item in the first program series recording schedule for the first DVR system;
- a device, at least in part implemented in hardware, that adds the multimedia program series recording item to the second program series recording schedule for the second DVR system;
- a device, at least in part implemented in hardware, that updates the display of the second program series recording schedule for the second DVR system to include a display of the multimedia program series recording item in the second recording schedule.

14. The apparatus of claim 13, further comprising:
- a device, at least in part implemented in hardware, that sends data representing the multimedia program series recording item to the second DVR system;
- a device, at least in part implemented in hardware, that receives a confirmation from the second DVR system that the multimedia program series recording item has been added to a client-side instance of the second program series recording schedule, the client-side instance of the second program series recording schedule being stored on the second DVR system.

15. The apparatus of claim 14, wherein the display of the second program series recording schedule for the second DVR system is updated to include the display of the multimedia program series recording item in the second recording schedule in response to receiving the confirmation from the second DVR system that the multimedia program series recording item has been added to the client-side instance of the second program series recording schedule.

16. The apparatus of claim 13, further comprising:
- a device, at least in part implemented in hardware, that synchronizes a server-side instance of the second program series recording schedule with a client-side instance of the second program series recording schedule resulting in adding the multimedia program series recording item in the client-side instance of the second program series recording schedule;
- wherein the client-side instance of the second program series recording schedule is a data component of the second DVR system.

17. The apparatus of claim 13, further comprising: a device, at least in part implemented in hardware, that, in response to receiving search criteria, searches a program guide to identify one or more multimedia programs that satisfy the search criteria.

18. The apparatus of claim 13, further comprising: a device, at least in part implemented in hardware, that establishes a network connection with the second DVR system and sends data representing the multimedia program series recording item to the second DVR system over the network connection.

* * * * *